United States Patent
Okuta

(10) Patent No.: US 8,188,984 B2
(45) Date of Patent: May 29, 2012

(54) INPUT RECEPTION DEVICE, AREA CONTROL METHOD, INFORMATION RECORDING MEDIUM, AND PROGRAM

(75) Inventor: Masafumi Okuta, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 287 days.

(21) Appl. No.: 12/673,261

(22) PCT Filed: Aug. 6, 2008

(86) PCT No.: PCT/JP2008/064135
§ 371 (c)(1),
(2), (4) Date: Feb. 12, 2010

(87) PCT Pub. No.: WO2009/022607

PCT Pub. Date: Feb. 19, 2009

(65) Prior Publication Data

US 2011/0199312 A1    Aug. 18, 2011

(30) Foreign Application Priority Data

Aug. 14, 2007    (JP) ................................. 2007-211223

(51) Int. Cl.
*G06F 3/041*    (2006.01)
(52) U.S. Cl. ........................ 345/173; 345/156
(58) Field of Classification Search .................. 345/156, 345/173–179; 178/18.01–18.05, 19.01–19.03
See application file for complete search history.

(56) References Cited

FOREIGN PATENT DOCUMENTS

| JP | H05-127853 | 5/1993 |
|---|---|---|
| JP | H09-081320 | 3/1997 |
| JP | H10-143319 | 5/1998 |
| JP | 2002-325965 | 11/2002 |
| JP | 2005-234199 | 9/2005 |
| JP | 2005-237680 | 9/2005 |
| JP | 2006-133887 | 5/2006 |
| JP | 2007-041790 | 2/2007 |
| KR | 10-2006-0086309 | 7/2006 |

OTHER PUBLICATIONS

Korean Office Action with English Translation dated May 25, 2011.
Notification of Reason for Refusal mail date of May 11, 2010 for Japanese Patent Application No. 2007-211223 and English Translation, 4 pages.
Office Action of Oct. 27, 2009 for Japanese Patent Application No. 2007-211223 and English Translation, 8 pages.

*Primary Examiner* — Ricardo L Osorio

(74) *Attorney, Agent, or Firm* — Howard & Howard Attorneys PLLC

(57) ABSTRACT

A display control unit (101) displays a key image, which serves as an operation target, etc. on a display unit. An area memory unit (103) stores a reception area (area information) corresponding to the displayed key image. A detecting unit (104) senses a user's touching operation and detects its touch position. A determining unit (105) makes determinations whether the detected touch position is within the range of the reception area stored in the area memory unit (103), etc. A time measuring unit (106) measures a time period that has elapsed since the touching operation. When a touching operation is detected, an area control unit (107) expands a reception area that includes the touch position to a predetermined range. Thereafter, the area control unit (107) reduces the expanded reception area to its original size when the time measuring unit (106) measures a predetermined time period.

16 Claims, 17 Drawing Sheets

INPUT RECEPTION DEVICE, AREA CONTROL METHOD, INFORMATION RECORDING MEDIUM, AND PROGRAM

TECHNICAL FIELD

The present invention relates to an input reception device, an area control method, an information recording medium, and a program that can appropriately prevent an input failure in continuous touching operations.

BACKGROUND ART

Conventionally, touch panels have been used commonly as one kind of input device that receives an input operation from a user. Such a touch panel is disposed on the front face of a display unit such as a Liquid Crystal Display (LCD) and waits for a touching operation (a contact, etc.) to be given by a user's finger or a touch pen (a stylus or the like) in a state that the display unit displays a target image (e.g., a button image). When an area (a reception area) on the touch panel that corresponds to the button image is touched, the input device enters instruction information, etc. assigned to the touched button image.

Recently, compact devices such as portable game devices, mobile phones (portable terminals), etc. have come to carry a touch panel. In general, users hold such a compact device in one hand and give a touching operation to the touch panel by the other hand (a finger or a touch pen), often resulting in that the user's finger or the like shakes and misses the point. When giving a touching operation with a touch pen, users often let it slip on the touch panel to be out of position.

When a touching operation is given to an edge (boundary) of the button image on the touch panel, the finger or the like that has touched down might shake, coming into and out of the reception area repeatedly, raising a concern that determination of an input might run an intermittent repetition of ON and OFF (i.e., there occurs a chattering).

A disclosed technique for appropriately preventing occurrence of such a chattering detects any touch to the touch panel, and in response, expands the reception area (recognition area) of the touched button image within an extent that it does not overlap other reception areas to perform determination based on the position of the finger or the like when it is detached (released) from the touch panel and the expanded reception area (e.g., see Patent Literature 1).

Patent Literature 1: Unexamined Japanese Patent Application KOKAI Publication No. 2006-133887 (pp. 5-10, FIG. 5)

DISCLOSURE OF INVENTION

Problem to be Solved by the Invention

The technique of Patent Literature 1 described above makes it possible to appropriately prevent occurrence of a chattering due to shakes of a finger or a touch pen while it is touching the touch panel (during a period from touch to release).

However, in a situation where touching operations are continuously given to the same place (i.e., a situation of repeating touch and release a plurality of times in a short period), a gradual shift of the position hit by the touching operations (the position to be touched) might entail. When it entails, the problem explained below, which has been verified to be unsolvable by the technique disclosed in Patent Literature 1, eventually occurs.

For example, mobile phones commonly employ an input system called multi-tap as their text entry system. This system assigns a plurality of letters to each key, and in response to each continuous press to the same key, switches among the target letters in order.

When implemented on a touch panel, such a multi-tap system displays a predetermined number of key images (e.g., images representing letter keys, etc.) on a display unit and lets a user touch a desired key image (to be more specific, a reception area on the touch panel). An actual scene of text entry will naturally include a situation where the same key image is touched a plurality of times repetitively.

As such touching operations are repeated, a position touched might fall out of the key image (reception area), which renders the inputs to the key image canceled and un-entered, requiring the user to reconfirm the position that should be touched and restart the touching operations from scratch.

Further, limitations on size, resolution, etc. of a display unit often require the key images to be displayed with a considerably small interval between them (with virtually no space between them). In such a case, a position touched in continuous touching operations that falls out of an intended key image constitutes an input to another key image, leading to a problem of an erroneous input.

Furthermore, apart from such text entry cases as above, various other situations where touching operations are repeated to the same target possibly exist. For example, one such situation is where a plurality of command images on a portable game device that are used for instructing a character to do some actions, etc. are displayed and inputs to the command images via a touch panel are received.

Such a case can also include a scene in which a player has to continuously instruct his/her character to do the same action, bringing about a situation where a touching operation is performed on the same command image a plurality of times. Then, a position touched in the repetitive touching operations might be off the intended command image and likewise produce invalidation of an action instruction or an erroneous input of another kind of action instruction.

Hence, there has been a demand for a technique that prevents input failures, such as invalidation (un-entry) or erroneous input of a touching operation in a situation where touching operations are repeated to the same target.

The present invention was made to solve these problems and an object of the present invention is to provide an input reception device, an area control method, an information recording medium, and a program that can appropriately prevent an input failure in continuous touching operations.

Means for Solving the Problem

An input reception device according to a first aspect of the present invention is an input reception device that receives an input via a touch panel disposed on a display unit, and includes an area memory unit, a detecting unit, a determining unit, and an area control unit.

The area memory unit stores area information about an area on the touch panel, which is a variable reception area corresponding to a predetermined target image displayed on the display unit. The detecting unit detects, in response to a touching operation to the touch panel, its touch position. The determining unit determines whether the detected touch position is within or outside the range of the stored reception area. The area control unit sets a reception area that matches the display area of the target image in the area memory unit; when a touch position is detected and determined to be within the range, expands the reception area to a predetermined range; and when a touching operation is not given to the expanded reception area within a predetermined time period, reduces the expanded reception area back to the reception area before being expanded.

That is, when the detecting unit detects a touching operation, the determining unit specifies its touch position and determines that the touch position is within the reception area of a given target image. For example, when the touch position is within the reception area of a target image A, the area control unit expands the reception area of the target image A. When a touching operation is to be given continuously to the target image A in this state, the detecting unit shall detect this continuous touching operation before a predetermined time period (e.g., 0.3 second) elapses. That is, the determining unit shall determine whether the next touch position is within or outside the range of the expanded reception area of the target image A.

Hence, even if the touch position falls a bit out of the display area of the target image A but lands within the expanded reception area, it is possible to determine that the touching operation has been directed to the target image A.

On the other hand, when a touching operation is to be given to a target image B after expansion of the reception area of the target image A, the time elapsed between the expansion and the touch is longer than the predetermined time period because of including moving a touch pen or the like. The expanded reception area of the target image A has already got back to its original size matching the display area. Hence, even if the target image B exists immediately next to the target image A, it is possible to determine in the reception area of the target image B that the touching operation has been directed to the target image B.

Accordingly, it is possible to appropriately prevent an input failure in continuous touching operations.

An input reception device according to a second aspect of the present invention is an input reception device that receives an input via a touch panel disposed on a display unit, and includes a display control unit, an area memory unit, a detecting unit, a determining unit, a time measuring unit, and an area control unit.

First, the display control unit displays a target image, which serves as an operation target, on the display unit. The area memory unit stores area information about an area on the touch panel, which is a variable reception area corresponding to the displayed target image. In response to a touching operation, including a contact, to the touch panel, the detecting unit detects its touch position.

The determining unit determines whether a detected touch position is within or outside the range of a stored reception area. The time measuring unit measures a time period that has elapsed since a touching operation. The area control unit sets a first reception area that matches the display area of the target image in the area memory unit; when a touch position is detected and determined to be within the range, expands the first reception area to a second reception area that covers a larger range than the first reception area; and when a touching operation is not given to the second reception area until the measured time period becomes equal to a predetermined time period, reduces the second reception area to the first reception area.

That is, when the detecting unit detects a touching operation, the determining unit specifies its touch position and determines it to be within the range of the first reception area of a given target image. Then, the area control unit expands the reception area of that target image to a second reception area, and the time measuring unit starts measuring a time period that has elapsed since the touching operation. When a touching operation is to be given continuously in this state, the detecting unit shall detect another touching operation before the time period measured by the time measuring unit becomes equal to a predetermined time period (e.g., 0.3 second). That is, the determining unit shall determine whether the next touch position is within or outside the range of the second reception area to which the first reception area is expanded.

Hence, even if the touch position falls a bit out of the display area of the target image but lands within the second reception area, it is possible to determine that the touching operation has been directed to that target image.

On the other hand, a touching operation that is to be given, after the reception area of the current target image was expanded to the second reception area, to another target image than this target image will let the time measuring unit measure a time period that is longer than the predetermined time period because of including moving a touch pen or the like. The reception area expanded to the second reception area has already got back to the original first reception area. Hence, even if this other target image exists immediately next to the former target image, it is possible to determine in the first reception area of this another target image that the touching operation has been directed to this another target image.

Accordingly, it is possible to appropriately prevent an input failure in continuous touching operations.

The area control unit may expand the reception area by gradually changing at least one of its shape and its size based on the number of touching operations.

In this case, expansion, etc. of the reception area is along with an increase in the number of touching operations, bringing more efficiency in prevention of input failure, etc.

The area control unit may expand the reception area toward a predetermined direction based on a change of touch positions.

In this case, for example, the reception area will be expanded in a direction in which touching operations of a user are shifted, bringing more efficiency in prevention of input failure, etc.

The input reception device may further include a target image control unit that expands or reduces the target image to the size of a corresponding reception area, which is expanded or reduced by the area control unit.

In this case, a target image corresponding to a reception area and having the same size as the reception area is also subjected to expansion, etc. to match the size of the reception area, making it possible to visually recognize that an input failure, etc. is prevented.

The display unit may display thereon a predetermined number of the target image in an array.

The input reception device may further include a target image control unit that, after a predetermined touching operation is given, changes the display contents of a plurality of target images that are arrayed in the vicinity of the target image that is given that touching operation. For example, if the key image display for multi-tap text entry is changed when a long press or the like is given or when the number of touching operations reaches a predetermined number (e.g., two), the text entry will be more facilitated.

Each of the target images may be in advance assigned a plurality of different letters.

The target image control unit may change the respective letters assigned to the target image that is given a touching operation, such that the letters become the display contents of the target images arrayed in the vicinity of the target image given the touching operation respectively. For example, if the respective letters that are assigned to a target image that is given a touching operation are displayed in the vicinity of that target image, text entry will be more efficient in a multi-tap system.

An input reception device according to a third aspect of the present invention is an input reception device that receives an input via a touch panel disposed on a display unit, and includes a display control unit, a determining unit, and a target image control unit.

First, the display control unit displays an array of a predetermined number of target images (e.g., key images), each of which is in advance assigned a plurality of different letters, on the display unit. The determining unit detects a touching operation including a contact that is given to the touch panel, and determines any of the target images that is given the touching operation. The target image control unit changes, after a predetermined touching operation (e.g., a long press, etc.) is given, the display contents of the target images that are arrayed in the vicinity of the target image that is given that touching operation, to the letters assigned to the target image given the touching operation respectively.

That is, the target image control unit changes the display contents of the key images that are arrayed in the vicinity of the key image that is given a long press, etc. to the letters assigned to the key image that is given the long press, etc.

This makes the letters assigned to the key image given the long press, etc. be displayed at the same time on the key images that exist in the vicinity, making it possible for a user to more efficiently enter a text.

An area control method according to a fourth aspect of the present invention is an area control method of an input reception device that includes a memory unit and receives an input via a touch panel disposed on a display unit, and the method includes a detecting step, a determining step, and an area controlling step.

The memory unit stores area information about an area on the touch panel, which is a variable reception area corresponding to a predetermined target image displayed on the display unit. At the detecting step, in response to a touching operation to the touch panel, its touch position is detected. At the determining step, it is determined whether a detected touch position is within or outside the range of a reception area stored in the memory unit. At the area controlling step, a reception area that, in its initial state, matches the display area of the target image is set in the memory unit. Also, when a touch position is detected and determined to be within the range, the reception area is expanded to a predetermined range, and when a touching operation is not given to the expanded reception area within a predetermined time period, the expanded reception area is reduced back to the reception area before being expanded.

That is, when a touching operation is detected at the detecting step, its touch position is specified at the determining step and determined to be within a reception area of a given target image. For example, when the touch position is within the reception area of a target image A, the reception area of the target image A is expanded at the area controlling step. When a touching operation is to be given continuously to the target image A in this state, this continuous touching operation shall be detected at the detecting step before a predetermined time period (e.g., 0.3 second) elapses. That is, it shall be determined at the determining step whether the next touch position is within or outside the range of the expanded reception area of the target image A.

Hence, even if the touch position falls a bit out of the display area of the target image A but lands within the expanded reception area, it is possible to determine that the touching operation has been directed to the target image A.

On the other hand, when a touching operation is to be given to a target image B after expansion of the reception area of the target image A, the time elapsed between the expansion and the touch is longer than the predetermined time period because of including moving a touch pen or the like. The expanded reception area of the target image A has already got back to its original size matching the display area. Hence, even if the target image B exists immediately next to the target image A, it is possible to determine in the reception area of the target image B that the touching operation has been directed to the target image B.

Accordingly, it is possible to appropriately prevent an input failure in continuous touching operations.

An information recording medium according to a fifth aspect of the present invention stores a program for controlling a computer (including an electronic device) to function as the input reception device described above.

A program according to a sixth aspect of the present invention controls a computer (including an electronic device) to function as the input reception device described above.

This program may be recorded on a computer-readable information recording medium such as a compact disk, a flexible disk, a hard disk, a magneto-optical disk, a digital video disk, a magnetic tape, a semiconductor memory, etc.

The program may be distributed or sold through a computer communication network independently from a computer on which the program is executed. The information recording medium described above may be distributed or sold independently from the computer.

Effect of the Invention

In accordance with the present invention, it is possible to appropriately prevent an input failure in continuous touching operations.

Figure 1:
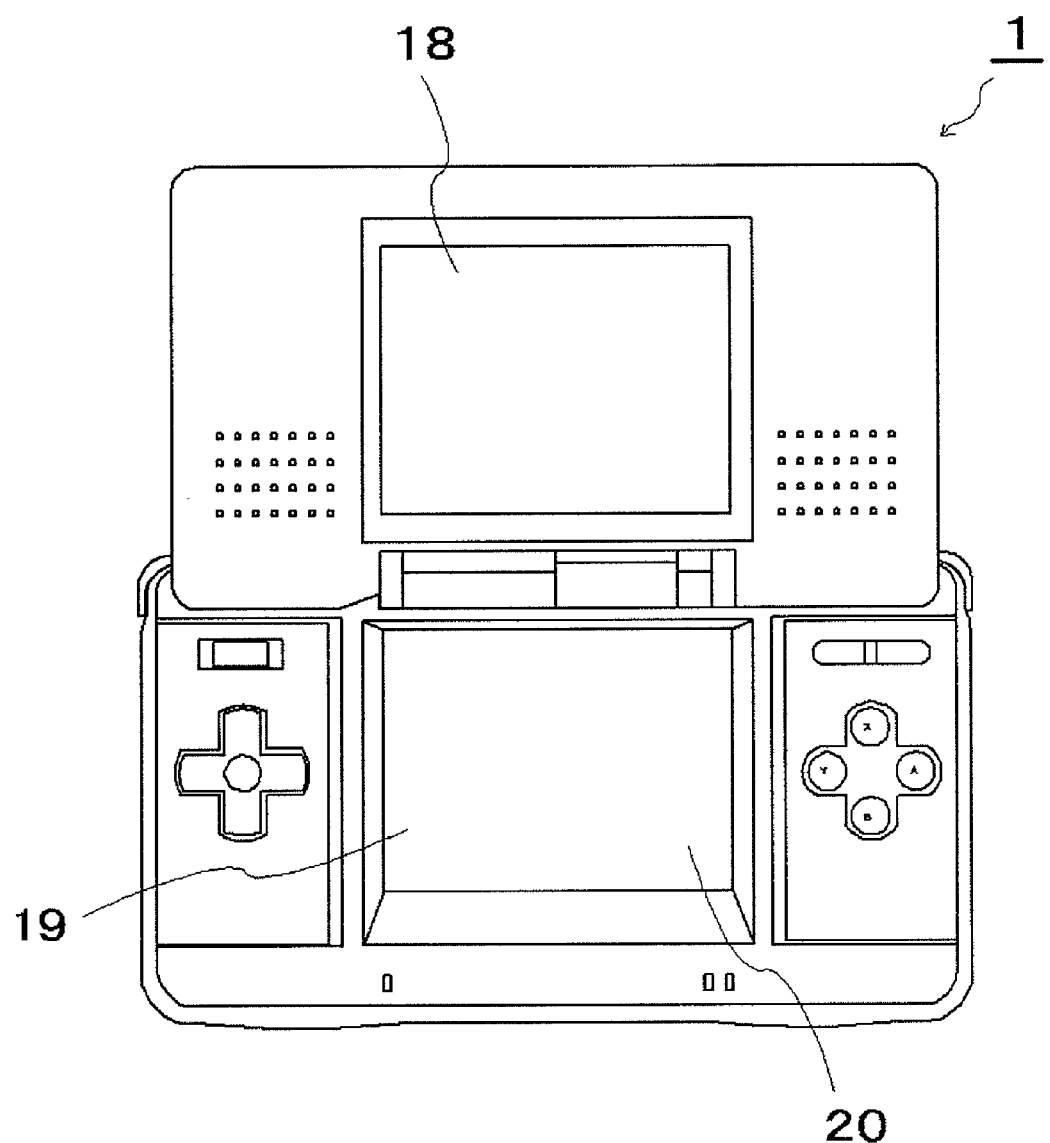
FIG. 1 is an exemplary diagram showing appearance of a game device according to an embodiment of the present invention.

EXPLANATION OF REFERENCE NUMERALS 1 game device
10 process control unit
11 connector
12 cartridge
13 wireless communication unit
14 communication controller
15 sound amplifier
16 speaker
17 operation keys
18 first display unit
19 second display unit
20 touch panel
100 input reception device
101 display control unit
102 process control unit
103 area memory unit
104 detecting unit
105 determining unit
106 time measuring unit
107 area control unit

BEST MODE FOR CARRYING OUT THE INVENTION

Embodiments of the present invention will be described below. For ease of understanding, the embodiments below of the present invention are described as applications to portable game devices (game machines). However, the present invention may be similarly applied to information processing devices, such as various computers, PDAs, or mobile phones. In other words, the embodiments described below are provided to give explanations, but not to limit the scope of the present invention. Therefore, those skilled in the art can adopt embodiments in which some or all of the elements herein have been replaced with respective equivalents, and such embodiments are also to be included within the scope of the present invention.

Embodiment 1

FIG. 1 is an exemplary diagram showing appearance of a typical game device on which an input reception device according to the embodiments of the present invention is realized. As illustrated, the game device 1 characteristically includes a first display unit 18 and a second display unit 19, which each can display a predetermined image. A touch panel 20 is disposed on the front face of the second display unit 19.

Figure 2:
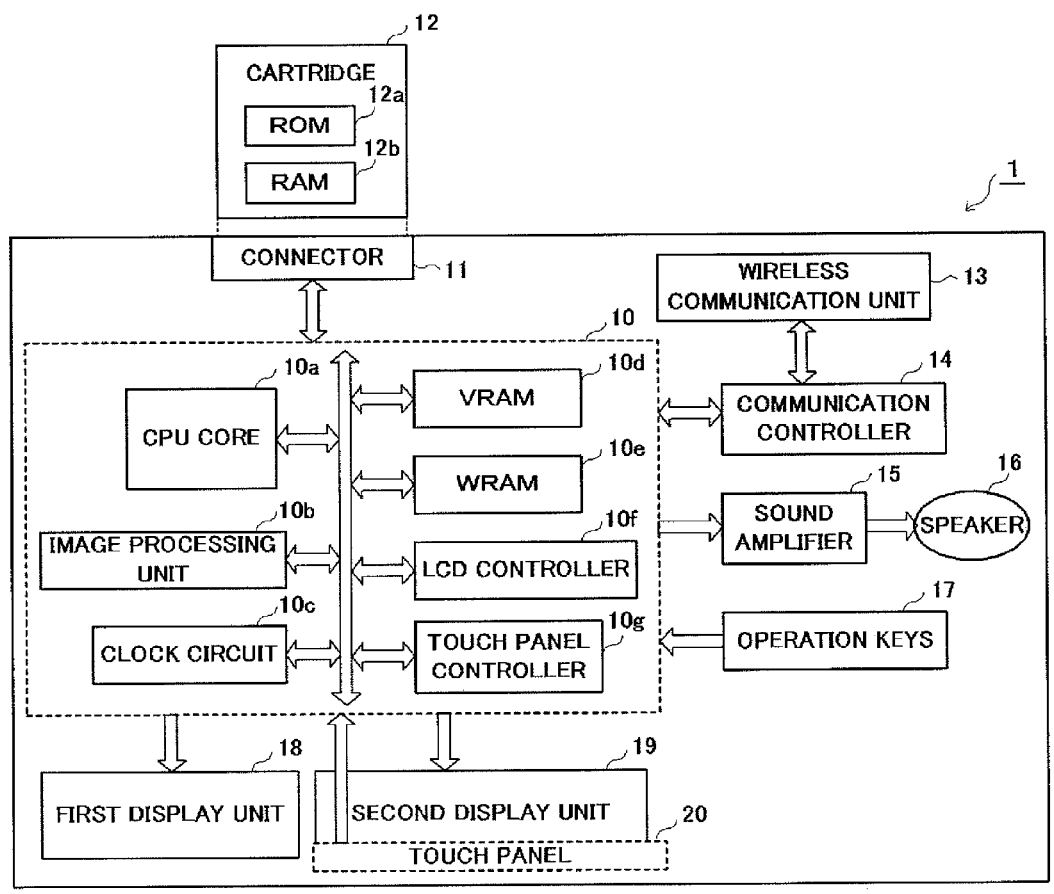
FIG. 2 is an exemplary diagram showing a schematic configuration of the game device according to the embodiment.

FIG. 2 is an exemplary diagram showing a schematic configuration of the game device of FIG. 1. The following explanation will be given with reference to FIG. 2.

The game device 1 includes a process control unit 10, a connector 11, a cartridge 12, a wireless communication unit 13, a communication controller 14, a sound amplifier 15, a speaker 16, operation keys 17, the first display unit 18, the second display unit 19, and a touch panel 20.

The process control unit 10 includes a Central Processing Unit (CPU) core 10a, an image processing unit 10b, a clock circuit 10c, a Video Random Access Memory (VRAM) 10d, a Work RAM (WRAM) 10e, a Liquid Crystal Display (LCD) controller 10f, and a touch panel controller 10g.

The Process Control Unit Further

The CPU core 10a controls the operation of the whole game device 1, being connected to each component to exchange control signals and data with it. Specifically, with the cartridge 12 inserted to the connector 11, the CPU core 10a reads out programs and data stored in a Read Only Memory (ROM) 12a in the cartridge 12 and performs a predetermined process.

The image processing unit 10b applies some process to the data read out from the ROM 12a in the cartridge 12 or to the data processed by the CPU core 10a and stores it in the VRAM 10d.

The clock circuit 10c serves to measure various kinds of time periods (or times of day). It checks the current time of day set in the game device 1 or measures the time period that is needed during the game.

The VRAM 10d is a memory that stores display information—i.e., image information processed by the image processing unit 10b, etc.

The WRAM 10e stores work data, etc. that are necessary for the CPU core 10a to perform various processes in accordance with a program.

The LCD controller 10f controls the first display unit 18 and the second display unit 19 to display a predetermined display image. For example, the LCD controller 10f converts image information stored in the VRAM 10d into display signals at predetermined synchronization timings and outputs them to the first display unit 18. The LCD controller 10f displays predetermined instruction icons, etc. on the second display unit 19.

The touch panel controller 10g detects a contact (touch) of a touch pen or a user's finger to the touch panel 20. For example, in a state that the predetermined instruction icons, etc. are displayed on the second display unit 19, the touch panel controller 10g detects a touch to or a release from the touch panel 20, the position of the touch or the release, etc.

The connector 11 is a terminal that can detachably connect with the cartridge 12, and when connected with the cartridge 12, exchange predetermined data with the cartridge 12.

The cartridge 12 includes the ROM 12a and a Random Access Memory (RAM) 12b.

The ROM 12a stores a program for realizing a game and image data, sound data, etc. that accompany the game.

The RAM 12b stores various data representing progress statuses of the game, etc.

The wireless communication unit 13 is a unit that wirelessly communicates with the wireless communication unit 13 of another game device 1, and exchanges predetermined data with it via an unillustrated antenna (built-in antenna or the like).

The wireless communication unit 13 is also capable of wirelessly communicating with a predetermined wireless access point. The wireless communication unit 13 is assigned a unique Media Access Control (MAC) address.

The communication controller 14 controls the wireless communication unit 13 and thereby intermediates between the process control unit 10 and its counterpart in another game device 1 in accordance with a predetermined protocol for them to perform wireless communication.

When the game device 1 connects to the Internet via a nearby wireless access point or the like, the communication controller 14 intermediates between the process control unit 10 and the wireless access point or the like in accordance with a wireless LAN protocol for them to perform wireless communication.

The sound amplifier 15 amplifies a sound signal generated by the process control unit 10 and supplies it to the speaker 16.

The speaker 16 is constituted by, for example, a stereo speaker or the like, and outputs a predetermined musical sound, sound effects, etc. in accordance with the sound signal amplified by the sound amplifier 15.

The operation keys 17 include a plurality of key switches, etc. that are properly arranged on the game device 1 in an array, and receive a predetermined instruction input in response to a user's operation.

The first display unit 18 and the second display unit 19 are constituted by a LCD or the like and display an appropriate game image, etc. under the control of the LCD controller 10f.

The second display unit 19 displays instruction icons, etc. via which a user touches the touch panel 20 to input an operation instruction.

The touch panel 20 is disposed on the front face of the second display unit 19, and receives an input that is given by a contact thereto of a touch pen or a user's finger.

The touch panel 20 is constituted by, for example, a pressure-sensitive touch sensor panel or the like, senses a pressure of a touch pen or the like to detect a touching operation such as a contact, its position (touch position), etc.

Otherwise, the touch panel 20 may detect a contact of a user's finger or the like based on a change in capacitance, etc.

(Schematic Configuration of the Input Reception Device)

Figure 3:
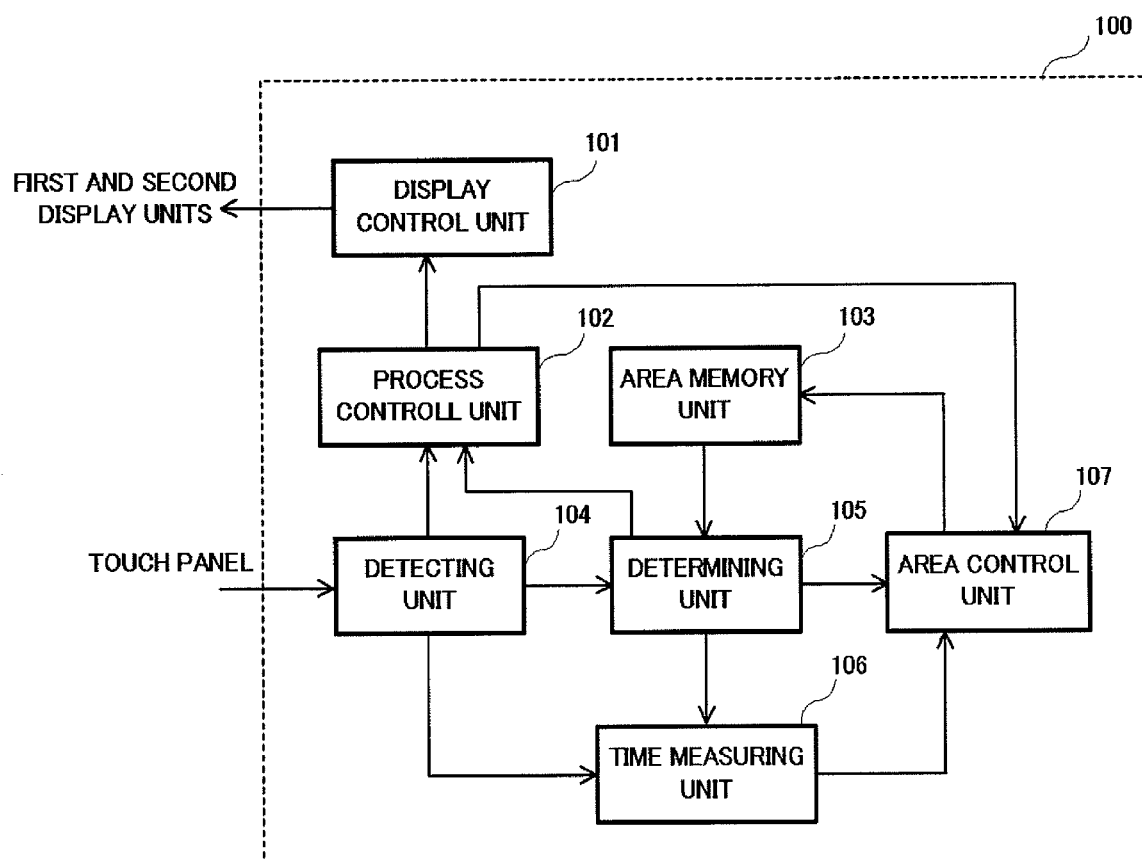
FIG. 3 is an exemplary diagram showing a schematic configuration of an input reception device according to the embodiment.

FIG. 3 is an exemplary diagram showing a schematic configuration of the input reception device 100 according to the present embodiment. The following explanation will be given with reference to FIG. 3.

The input reception device 100 includes a display control unit 101, a process control unit 102, an area memory unit 103, a detecting unit 104, a determining unit 105, a time measuring unit 106, and an area control unit 107.

The display control unit 101 displays various images on the display unit (the first display unit 18 or the second display unit 19 described above).

Figure 4A:
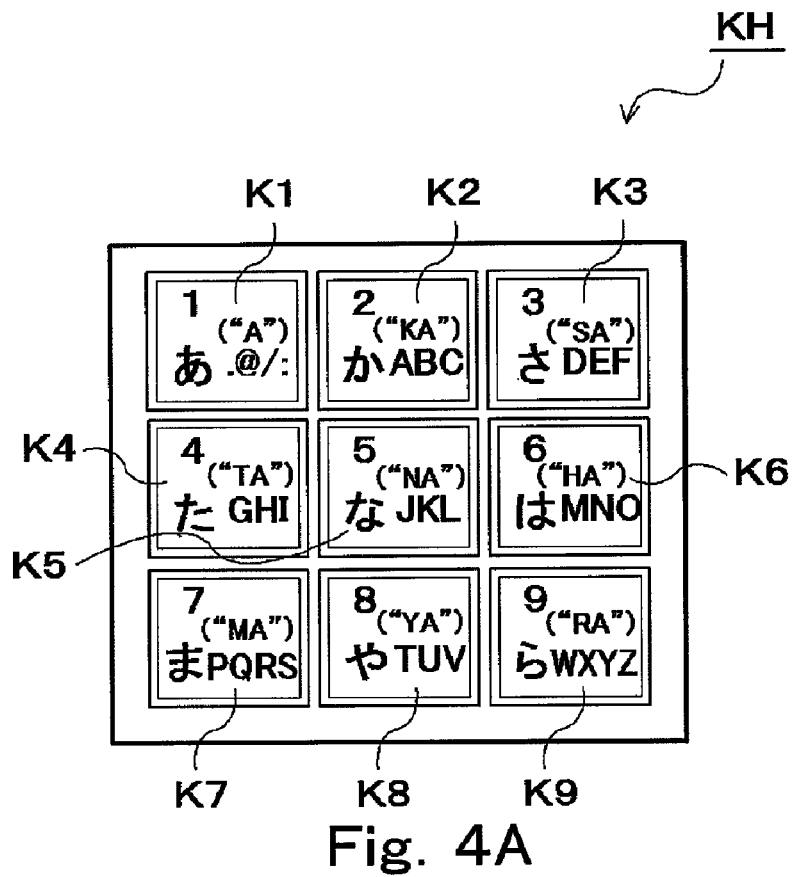
FIG. 4A is an exemplary diagram showing an example of key array image (or its respective key images) displayed.

For example, the display control unit 101 displays a target image, which serves as an operation target, on the second display unit 19 on which the touch panel 20 is disposed. Specifically, the display control unit 101 displays a key array image KH as shown in FIG. 4A on the second display unit 19.

For example, the key array image KH includes nine key images K (K1 to K9), which are arrayed with a relatively small interval between them. Each key image K is assigned a plurality of letters (to be more specific, a plurality of letter codes) in accordance with a multi-tap system.

For example, the key image K1 is assigned ten letters, namely "A", "I", "U", "E", "O", "a", "i", "u", "e", and "o" (which is an example case of a Japanese text input mode). When the key image K1 (or its corresponding reception area on the touch panel 20, to be more specific) is touched, the letters to be entered switch in order of, for example, "A"→"I"→"U", . . . .

When it switches to the last letter "o", the order returns and switches to the first letter "A". That is, the ten letters sequentially switch in circles.

The image processing unit 10b and the LCD controller 10f described above can function as the display control unit 101.

Returning to FIG. 3, the process control unit 102 controls the input reception device 100 as a whole.

For example, for a character's name, a user's nickname, etc. to be input, the process control unit 102 controls the display control unit 101 to have the above-described key array image KH, etc., displayed. In this state, the process control unit 102 acquires letters (letter string) input by the user, in accordance with a result of input determination made by the determining unit 105.

The CPU core 10a described above can function as the process control unit 102.

The area memory unit 103 stores reception areas (or range information or the like defining the areas) on the touch panel 20 that are set in correspondence to the key array image KH (or the respective key images K) displayed on the second display unit 19. The reception areas are where determination of whether to enter an input given to each key image K (or whether an input is effective) is performed.

Figure 4B:
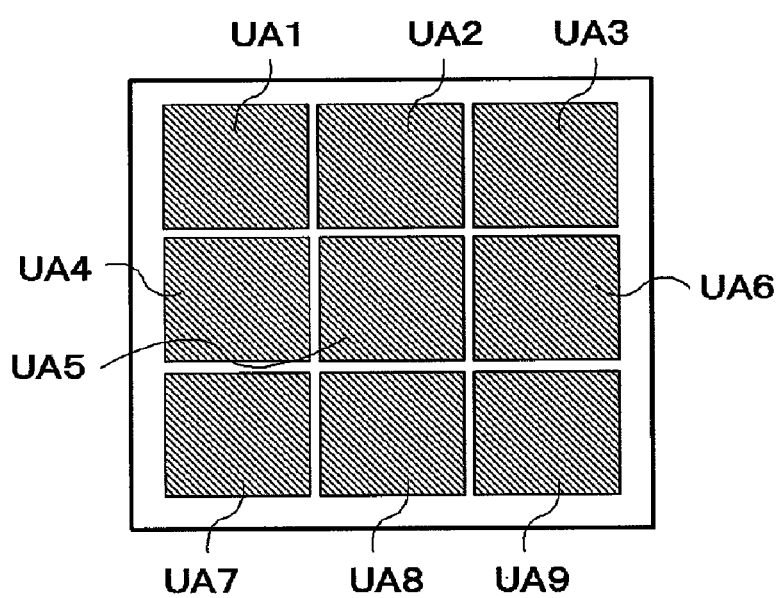
FIG. 4B is an exemplary diagram explaining reception areas corresponding to the key images respectively.

Specifically, as shown in FIG. 4B, the area memory unit 103 stores nine reception areas UA (UA1 to UA9) corresponding to the key images K (display areas) of FIG. 4A described above. FIG. 4B shows the sizes of the reception areas UA in their initial state (or standby state), in which they perfectly align with the key images K of FIG. 4A respectively.

In this state, when, for example, a touch pen touches an edge of the key image K5 (i.e., when a touching operation is given thereto), the determining unit 105, etc., which are to be described later, will let a letter assigned to the key image K5 be entered, as this position (touch position) is included in the reception area UA5.

On the other hand, when the key image K5 is missed but the key image K6 is touched on its edge, a letter assigned to the key image K6 will be entered because the position is included in the reception area UA6.

The area control unit 107 manages each reception area UA in a size-variable manner. As will be described in detail later, under some circumstance, the area control unit 107 has to expand any of the reception areas UA up to a predetermined range. Under such a circumstance, the area memory unit 103 shall store the reception areas UA including the expanded one.

The WRAM 10e described above can function as the area memory unit 103.

The detecting unit 104 senses occurrence of a touch to and a release from the touch panel 20 and detects their positions (or their positions on the touch panel in coordinate representation, etc.) based on some information (a signal or the like) acquired from the touch panel 20.

For example, in response to a touching operation (a contact, etc.) to the touch panel 20, the detecting unit 104 detects the touch position (the position of contact, etc.) Then, the detecting unit 104 supplies the detected touch position to the determining unit 105, the time measuring unit 106, etc.

The touch panel controller 10g described above can function as the detecting unit 104.

In response to a touching operation to the touch panel 20, the determining unit 105 determines where the input is given (and whether to enter the input, etc.) by using the information stored in the area memory unit 103.

For example, when supplied with a touch position from the detecting unit 104, the determining unit 105 determines whether the touch position is included in any of the reception areas UA, etc.

Figure 5A:
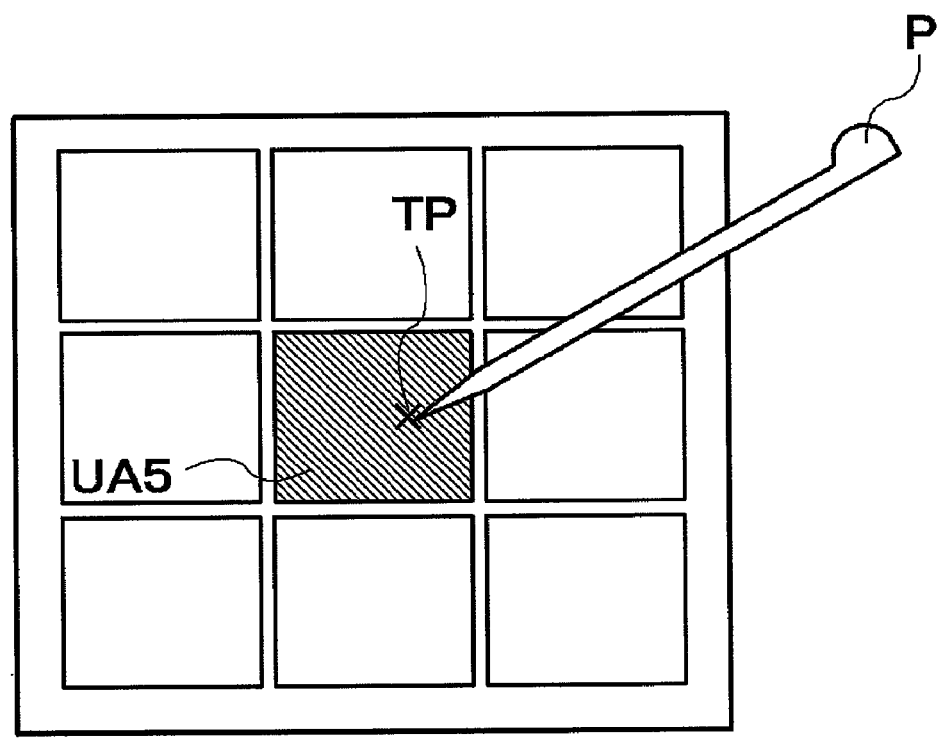
FIG. 5A is an exemplary diagram explaining the reception areas.

Specifically, the determining unit 105 determines whether or not a touch position TP touched by a touch pen P is included in the reception areas UA1 to UA9, as shown in FIG. 5A. In the case of FIG. 5A, the determining unit 105 determines that the touch position TP is included in the reception area UA5, i.e., that the corresponding key image K5 has been touched.

Figure 5B:
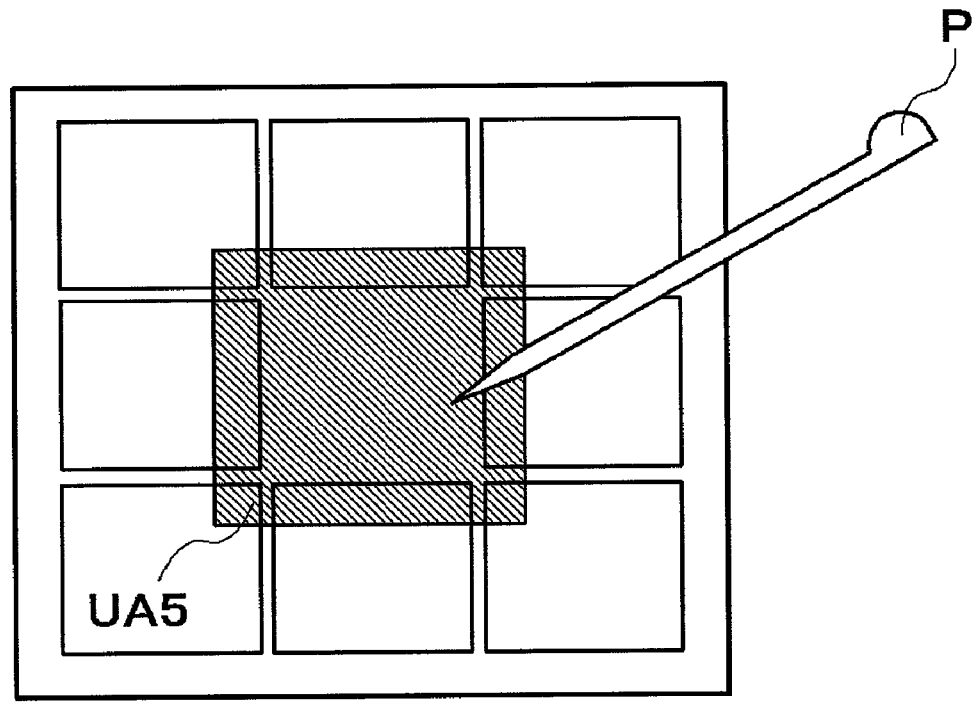
FIG. 5B is an exemplary diagram explaining a reception area that is expanded.

As will be described in detail later, when any reception area UA is expanded as shown in FIG. 5B, the determining unit 105 makes determinations by using the expanded reception area UA (e.g., the reception area UA5).

The CPU core 10a described above can function as the determining unit 105.

The time measuring unit 106 measures a predetermined time period in response to a touching operation to the touch panel 20.

For example, when supplied with a touch position from the detecting unit 104 in response to a touch to the touch panel 20, the time measuring unit 106 starts measuring the lapse of time from the time of the detection. This time period is measured to be compared with a standard time interval between continuous touching operations (i.e., a time period between the most recent touching operation and the touching operation immediately before the most recent one).

Specifically, suppose it has been experimentally or in any manner found that a time interval between touching operations that are given in a situation of repeating touching operations to the same key image K is, for example, 0.3 second at a maximum. Under this condition, when the time measuring unit 106 starts measuring an elapsed time period in response to an initial touching operation and within 0.3 second thereafter detects another touching operation, it is possible to determine that these touching operations are continuous (or that before the latter one, a touching operation has been given to the same key image K at least once).

On the other hand, a touching operation, which is to be given to a key image that is different from the one that is touched by a previous touching operation, needs an extra time period for a touch pen or the like to be moved or for some other reasons. A time period longer than 0.3 second (e.g., a time period of approximately 1 second) is needed therefor even if the user gives quick touching operations. Therefore, when the next touching operation is detected after 0.3 second has elapsed since the start of measurement of the time period by the time measuring unit 106, it is possible to determine that the touching operations are not continuous (or highly unlikely to be continuous).

The clock circuit 10c described above can function as the time measuring unit 106.

The area control unit 107 manages the size, etc. of each reception area UA stored in the area memory unit 103 in an appropriate manner.

For example, when the determining unit 105 determines that a touch position is included in any of the reception areas UA, the area control unit 107 expands that reception area UA to a predetermined range.

Specifically, when a touch position TP is determined to be included in the reception area UA5 as shown in FIG. 5A, the area control unit 107 expands the reception area UA5 as shown in FIG. 5B. That is, the area control unit 107 expands the reception area UA5 to such a range that overlaps, at a predetermined ratio, other surrounding reception areas UA.

In the state that the reception area UA5 is expanded, for example, during continuous touching operations by the user, it is possible to determine that the key image K5 (or the reception area UA5 before being expanded) has been entered, as long as the touched position is not greatly off the key image K5 (unless the touched position falls out of the reception area UA5 after being expanded).

When an elapsed time period that is measured by the time measuring unit 106 becomes as long as a predetermined time period (e.g., 0.3 second as above), the area control unit 107 reduces the expanded reception area UA5 to its original size.

That is, because there will be no (or highly unlikely no) continuous touching operation given after 0.3 second has elapsed, the area control unit 107 reduces the expanded reception area UA5 of FIG. 5B to its original size as shown in FIG. 5A. Therefore, in a touching operation directed to another adjoining key image K thereafter, a touch position is within bounds of its corresponding reception area UA, making this key image K be entered, not the key image K5.

The CPU core 10a described above can function as the area control unit 107.

Figure 6:
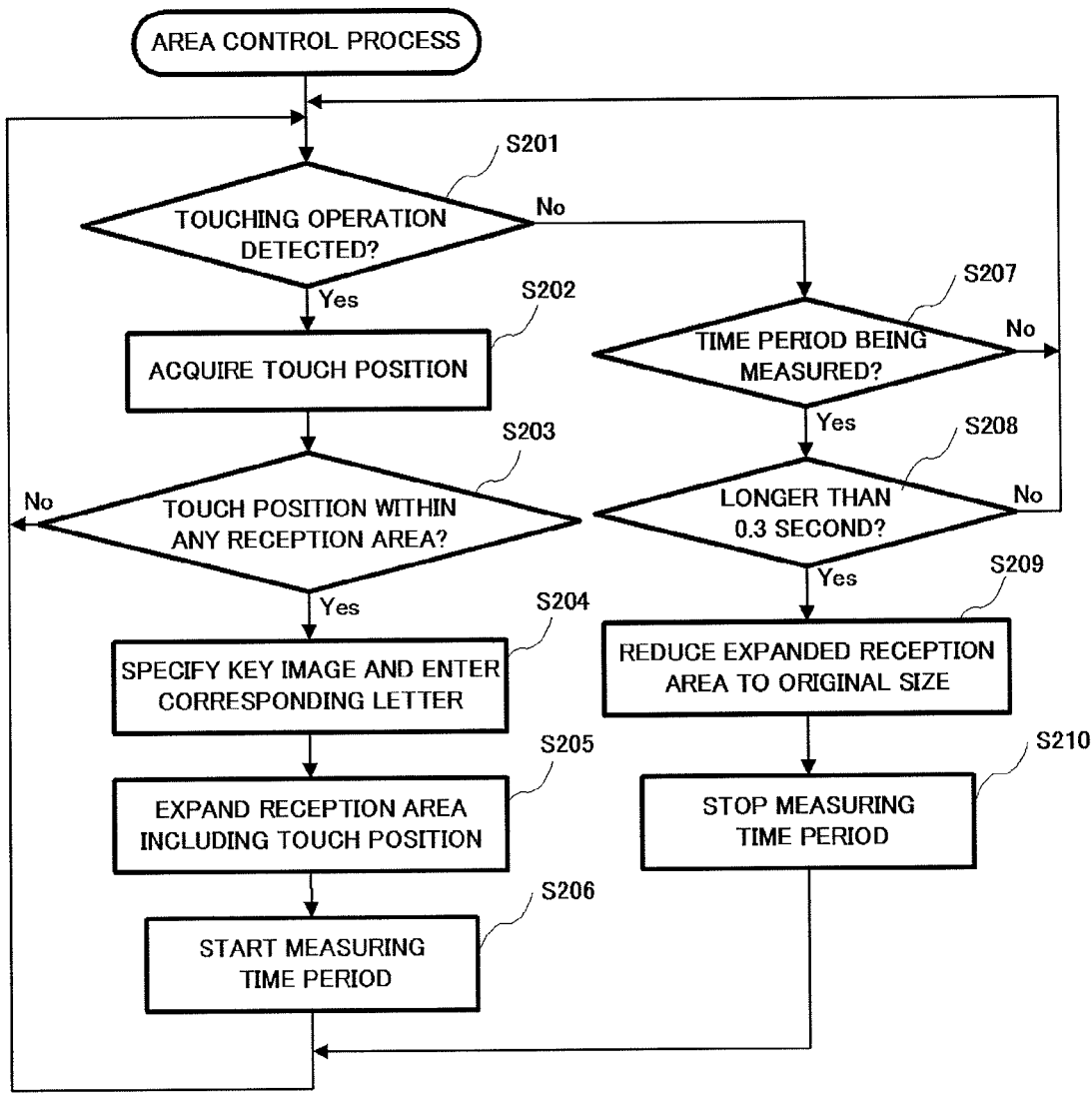
FIG. 6 is a flowchart showing the flow of an area control process according to the embodiment.

FIG. 6 is a flowchart showing the flow of an area control process performed by the input reception device 100 having the configuration described above. The following explanation will be given with reference to FIG. 6. The area control process will be started in a state that, for example, the key array image KH (or its respective key images K) shown in FIG. 4A is/are displayed on the second display unit 19. In the initial state, each reception area UA stored in the area memory unit 103 has the size of its corresponding key image K, as shown in FIG. 4B.

First, the input reception device 100 determines whether or not a touching operation has been detected (step S201). That is, the detecting unit 104 determines whether it has sensed a touching operation that starts by a contact to the touch panel and ends by a release from the touch panel.

Upon determination that no touching operation has been detected (step S201; No), the input reception device 100 advances the flow to step S207 described later.

On the other hand, upon determination that a touching operation has been detected (step S201; Yes), the input reception device 100 acquires the touch position (step S202). That is, in response to sensing a touching operation, the detecting unit 104 detects the touch position, which is the position of contact.

The input reception device 100 determines whether or not the detected touch position is included in any of the reception areas (step S203). That is, the determining unit 105 determines to which image key the input has been given (or whether or not to enter the input), etc. by using information about the reception areas stored at that time in the area memory unit 103.

That is, if it is in the initial state, the determining unit 105 compares such reception areas UA as shown in FIG. 4B presented above, none of which is expanded, with the touch position to determine to which image key K the input has been given, etc.

If it is in a state that any of the reception areas UA is expanded, the determining unit 105 compares such reception areas UA as shown in FIG. 5B presented above, which include the expanded one, with the touch position to make determinations.

Upon determination that the touch position is not included in any of the reception areas (step S203; No), the input reception device 100 returns the flow to step S201 described above.

On the other hand, upon determination that the touch position is included in any of the reception areas (step S203; Yes), the input reception device 100 specifies the key image to enter a corresponding letter (step S204).

That is, the process control unit 102 specifies any key image K of FIG. 4A that corresponds to the reception area UA in which the touch position is included, and enters a letter corresponding to the specified key image K.

The input reception device 100 expands the reception area in which the touch position is included (step S205). That is, the area control unit 107 expands the reception area UA shown in FIG. 5A in which the touch position TP is included (i.e., the reception area UA5 in the case of FIG. 5A) to a range where it overlaps, at a predetermined ratio, other surrounding reception areas UA as shown in FIG. 5B.

When a predetermined time period (e.g., 0.3 second) has not yet elapsed since the expansion by the last touching operation, the area control unit 107 keeps this reception area as is because it has been already expanded.

The input reception device 100 starts measuring an elapsed time period (step S206). That is, the time measuring unit 106 starts measuring a time period that has elapsed since this point in time.

When the time measuring unit 106 has already started measuring an elapsed time period (i.e., when 0.3 second has not yet elapsed since the last touching operation), the time measuring unit 106 resets the time period that has been measured to zero to restart measuring an elapsed time period.

Then, the input reception device 100 returns the flow to step S201 described above.

Upon determination at step S201 described above that no touching operation has been detected (step S201; No), the input reception device 100 determines whether or not an elapsed time period is currently being measured (step S207).

That is, the input reception device 100 determines whether the time measuring unit 106 is currently measuring an elapsed time period. Upon determination that an elapsed time period is not currently being measured (step S207; No), the input reception device 100 returns the flow to step S201 described above.

On the other hand, upon determination that an elapsed time period is currently being measured (step S207; Yes), the input reception device 100 determines whether or not the elapsed time period measured has exceeded 0.3 second (example) (step S208).

That is, when it has been experimentally or in any manner found that a time interval between continuous touching operations given to the same target image is 0.3 second, the input reception device 100 determines whether or not the elapsed time period has exceeded the found value of 0.3 second.

Then, upon determination that the elapsed time period has not become longer than 0.3 second (step S208; No), the input reception device 100 returns the flow to step S201 described above.

On the other hand, upon determination that the elapsed time period has exceeded than 0.3 second (step S208; Yes), the input reception device 100 reduces the expanded reception area to its original size (step S209). That is, here, it is possible to determine that continuous touching operations have not been given because there has been a substantial time interval taken between touching operations. Hence, the reception area should be reduced to its original size.

The input reception device 100 stops measuring the elapsed time period (step S210). That is, the input reception device 100 stops the time measuring unit 106 from measuring.

Then, the input reception device 100 returns the flow to step S201 described above.

This area control process can prevent input failures such as invalidation (non-entry) or erroneous input of a touching operation in a situation where touching operations are repeated to the same target.

Figure 7A:
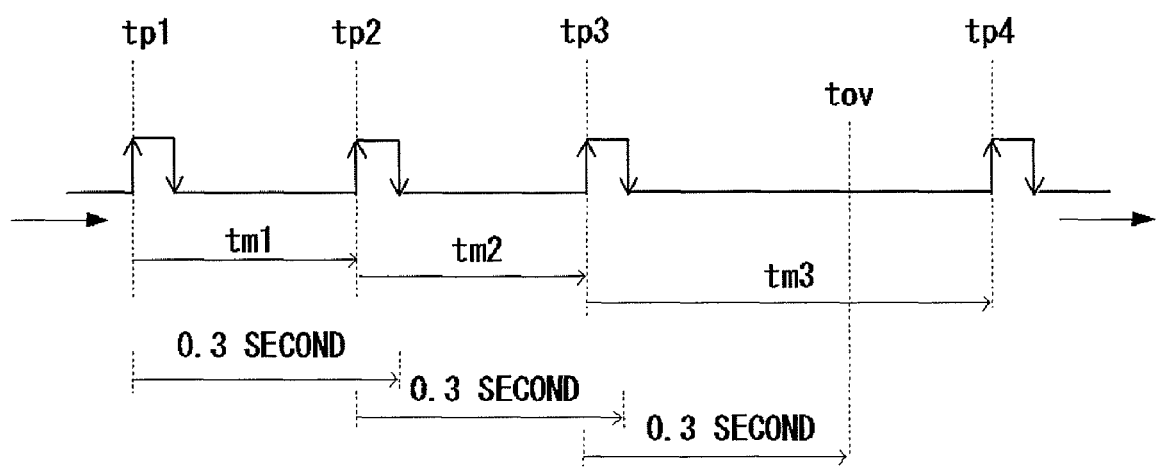
FIG. 7A is an exemplary diagram explaining timings of touching operations.
Figure 7B:
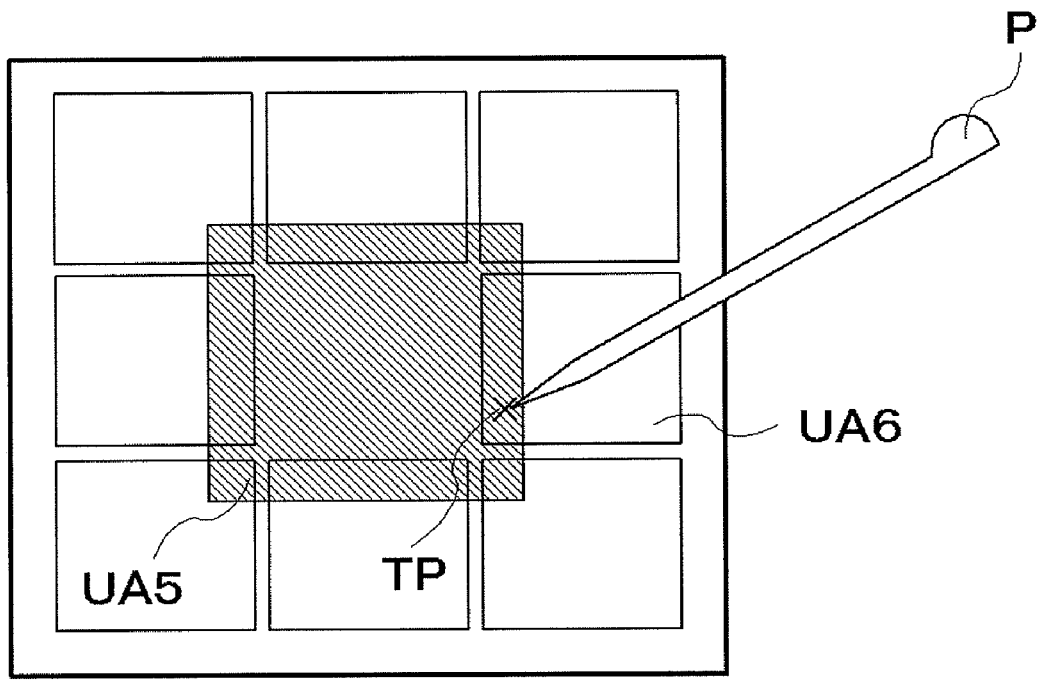
FIG. 7B is an exemplary diagram explaining how the reception areas are controlled.

That is, as shown in FIG. 7A, upon detection of a first touching operation tp1 by the detecting unit 104, the determining unit 105 specifies the touch position and determines in which reception area the touch position is included, etc. Here, when it is the reception area UA5 that includes the touch position, the area control unit 107 expands the reception area UA5 as shown in FIG. 7B. Along with this, the time measuring unit 106 starts measuring an elapsed time period.

When there is to be given a continuous touching operation to the same target in this state, the detecting unit 104 shall detect a second touching operation tp2 after a time period tm1, which is shorter than 0.3 second, as shown in FIG. 7A. Then, the determining unit 105 specifies the touch position of the second touching operation tp2 and determines in which reception area it is included, etc. Here, attending first to the reception area UA5 that has been expanded as shown in FIG. 7B, the determining unit 105 shall determine whether the touch position is included in the range of the reception area UA5 or the others, etc.

Hence, even when the touch position TP has fallen out of the former reception area UA5 to an edge of the reception area UA6, which is within the expanded reception area UA5 as shown in FIG. 7B, it is possible to determine that the key image K5 has been touched.

The area control unit 107 keeps the expanded reception area UA5 shown in FIG. 7B as is, and the time measuring unit 106 restarts measuring an elapsed time period after being reset to zero.

When another continuous touching operation is to be given to the same target in this state, the detecting unit 104 shall detect a third touching operation tp3 after a time period tm2, which is shorter than 0.3 second as shown in FIG. 7A. Then, likewise, the determining unit 105 determines whether the touch position is included in the range of the reception area UA5 or the others, etc.

In this case too, even if the touch position TP has fallen out of the original reception area UA5, it is possible to determine that the key image K5 has been touched as long as the touch position TP is within the expanded reception area UA5.

The area control unit 107 keeps the expanded reception area UA5 as is, and the time measuring unit 106 restarts measuring an elapsed time period after being reset to zero.

When a touching operation is to be given to another target in this state, the detecting unit 104 shall detect a fourth touching operation tp4 after a time period tm3, which is longer than 0.3 second, as shown in FIG. 7A.

Figure 7C:
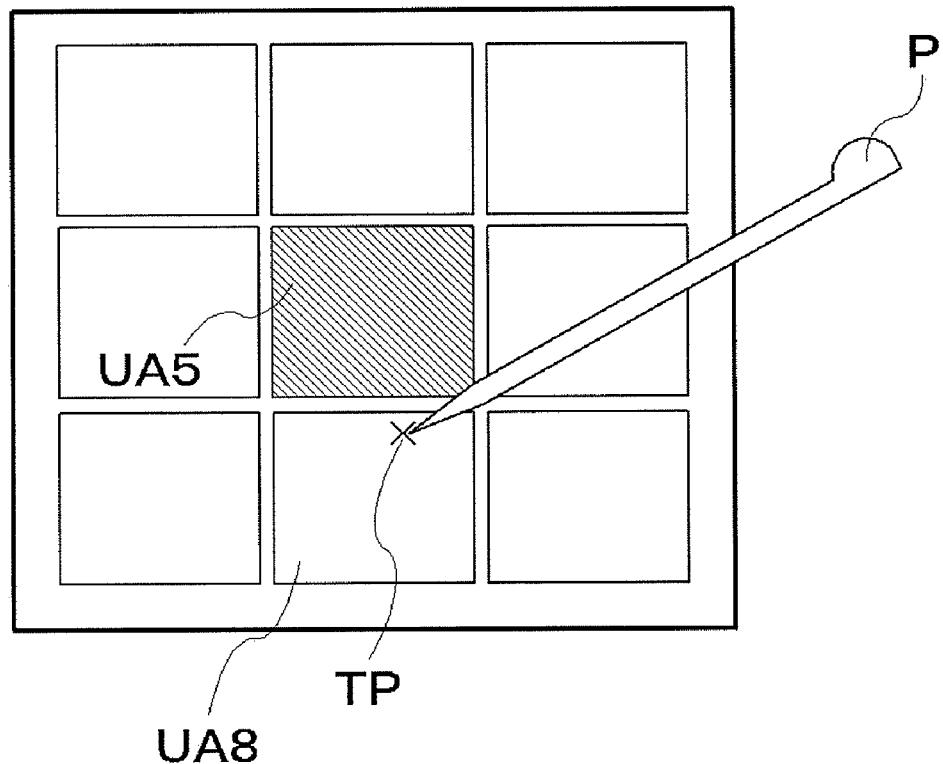
FIG. 7C is an exemplary diagram explaining how the reception areas are controlled.

During this time period tm3, the area control unit 107 shall reduce the expanded reception area UA5 to its original size as shown in FIG. 7C, at a timing tov at which 0.3 second elapses.

In this case, since the reception area UA5 has regained its original size, for example, even a touch position TP that is in an edge portion of the reception area UA8 as shown in FIG. 7C can be normally determined to be of a touching operation to the key image K8.

Accordingly, even if a position that is touched in repetitive touching operations to the same target (key image) is off the target, the corresponding reception area that is appropriately expanded can prevent the input from being invalidated or from being erroneously entered as another kind of input.

As a touching operation is to be given to another target (another key image), a predetermined time period (e.g., 0.3 second) has been exceeded because of including moving a touch pen or the like. The expanded reception area has its size reduced to its original. Hence, even if this other key image is located immediately next to the former key image, it is possible to determine in the reception area of this key image that the touching operation was given to this key image.

Hence, it is possible to appropriately prevent an input failure in continuous touching operations.

Another Embodiment

The embodiment described above has explained expansion of a reception area, wherein the reception area is expanded to a predetermined range at one time (in one stroke).

However, the manner of controlling expansion of a reception area is not limited to this but may be appropriately modified.

For example, in accordance with the number of continuous touching operations, the range to which a reception area is expanded may be enlarged in a discrete gradation manner or in a continuous gradation manner.

Figure 8A:
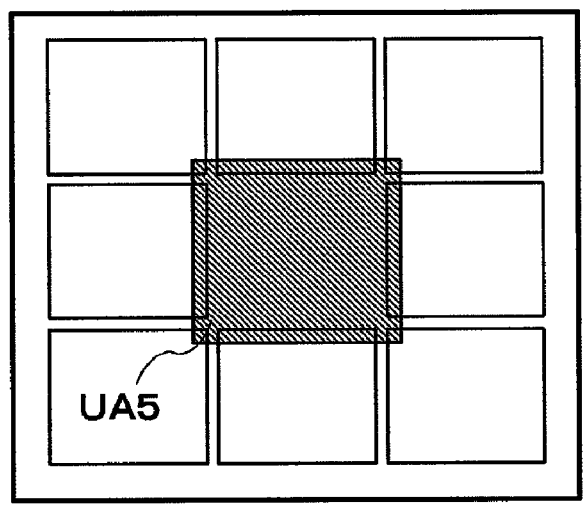
FIG. 8A is an exemplary diagram explaining how a reception area is expanded gradually.
Figure 8B:
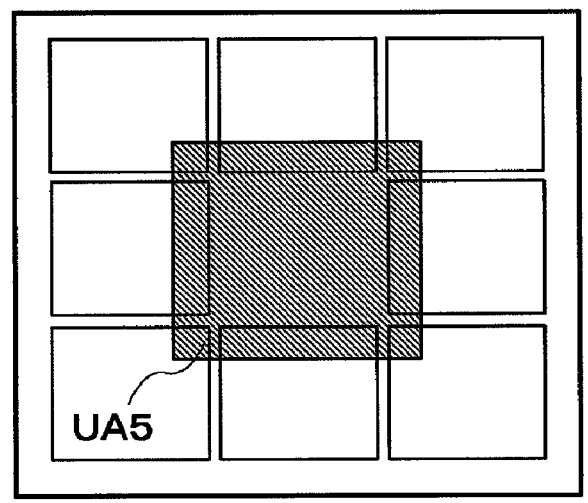
FIG. 8B is an exemplary diagram explaining how a reception area is expanded gradually.
Figure 8C:
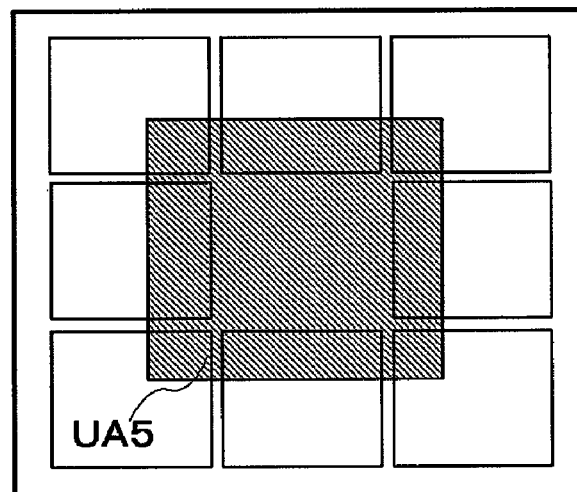
FIG. 8C is an exemplary diagram explaining how a reception area is expanded gradually.

Specifically, when the range to which a reception area UA is expanded is gradated in three stages, the area control unit 107 expands the reception area UA slightly at the first stage as shown in FIG. 8A, and to an even larger range at the second stage as shown in FIG. 8B. Then, at the third stage, the area control unit 107 expands the reception area UA to its maximum as shown in FIG. 8C.

As above, by expanding the reception area UA largely in accordance with the number of continuous touching operations, it is possible to appropriately deal with gradual shift of a touch position.

A reception area UA may be expanded toward a touch position, a direction of shift, etc, instead of expanding to all directions.

Figure 9A:
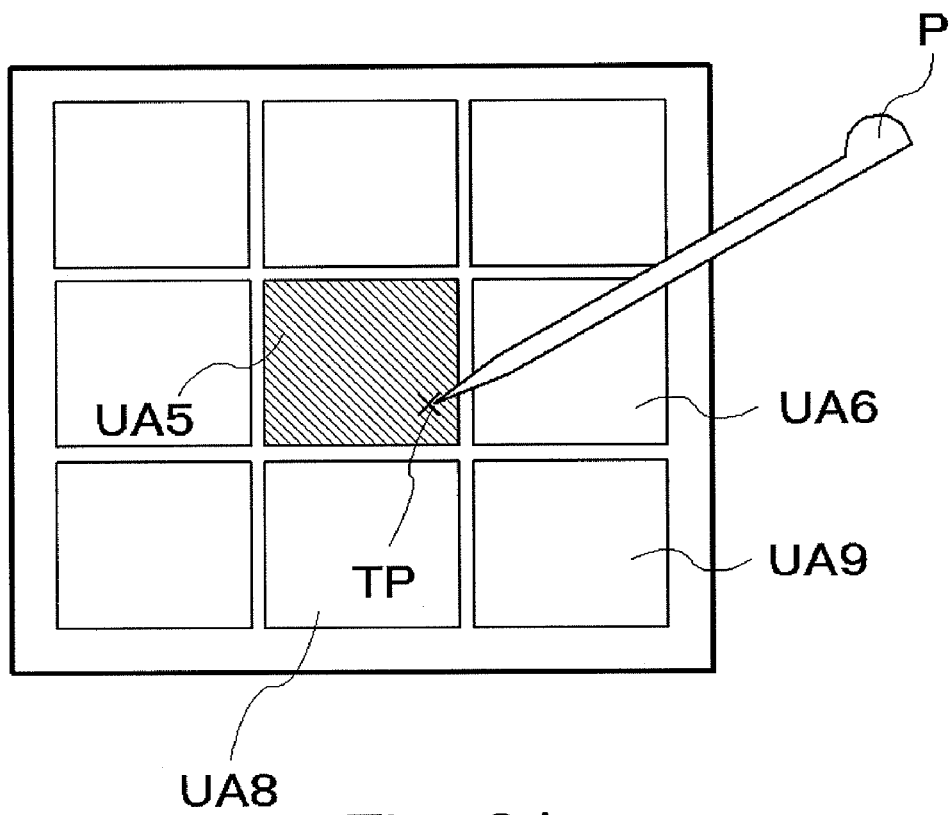
FIG. 9A is an exemplary diagram explaining how a reception area is expanded in a predetermined direction.
Figure 9B:
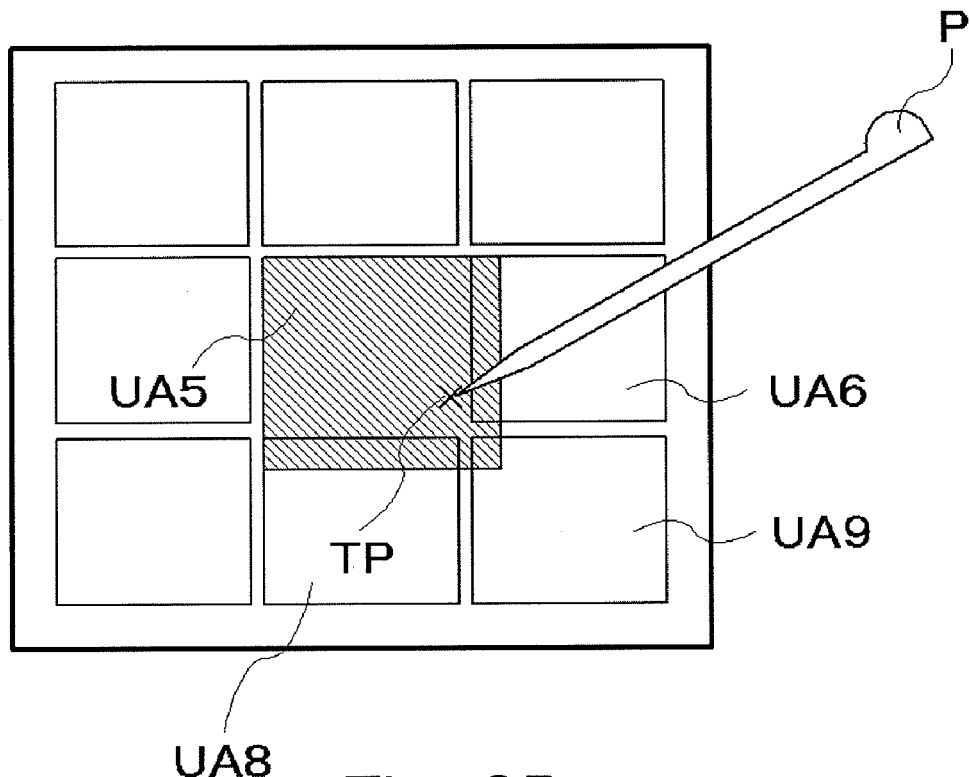
FIG. 9B is an exemplary diagram explaining how a reception area is expanded in a predetermined direction.

For example, when a first touch position TP is on a right lower portion of the reception area UA5 as shown in FIG. 9A, the area control unit 107 expands the reception area UA5 in the right-downward direction, i.e., only in the directions toward the reception areas UA6, UA9, and UA8, as shown in FIG. 9B.

Figure 9C:
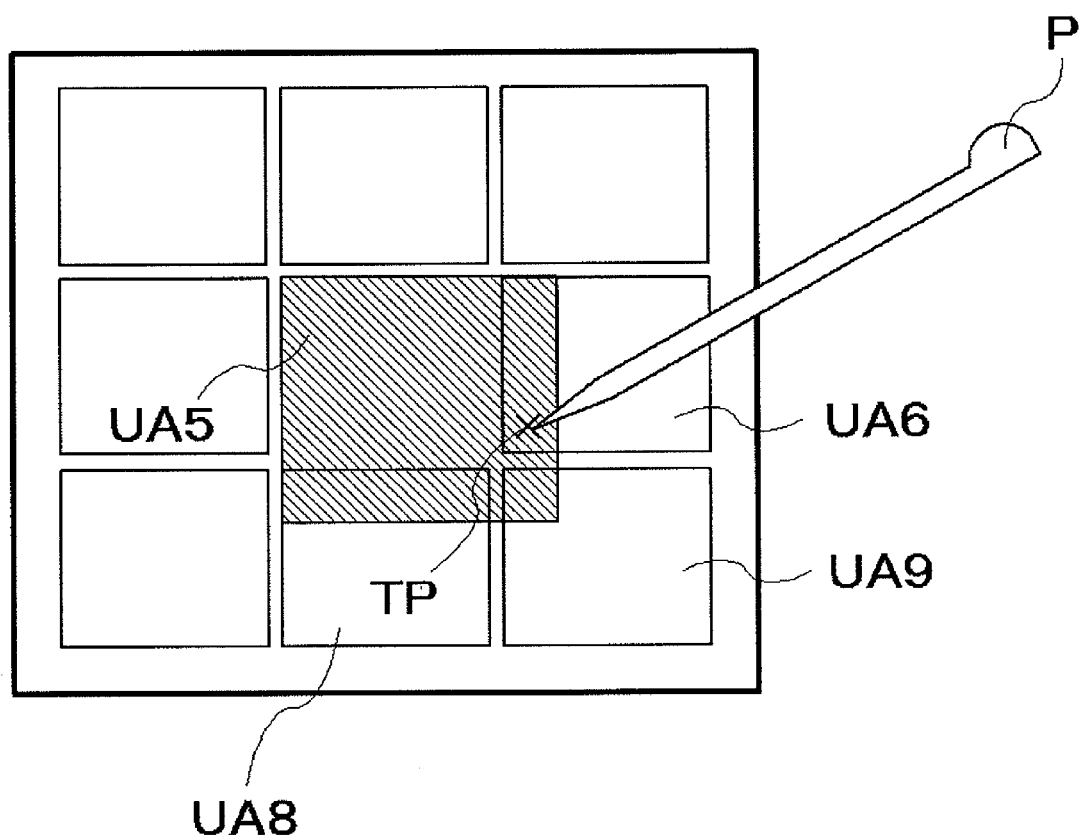
FIG. 9C is an exemplary diagram explaining how a reception area is expanded in a predetermined direction.

Then, when a second touch position TP touched in this state is expectedly shifted to the right-downward direction, the area control unit 107 further expands the reception area UA5 in the right-downward direction as shown in FIG. 9C.

In this case too, even if a touch position TP is off the original reception area UA5 to fall on an edge of the reception area UA6, which is within the expanded reception area UA5, it is possible to determine that the key image K5 has been touched.

Further, reduction of a reception area may also be performed not only at one time, but in discrete gradation or continuous gradation.

The embodiment described above has explained control for expansion, etc. of a reception area. Likewise, the size of the key images, etc., which are the user interface items, may also be subjected to expansion, etc. to match the reception areas.

For example, in response to that the area control unit 107 expands a given reception area UA, the display control unit 101 may likewise expand a key image K corresponding to that area, which is one of the key images K (K1 to K9) displayed on the second display unit 19. That is, the display control unit 101 functions as a target image control unit, and expands a key image K corresponding to an expanded reception area UA to cover exactly the same range as the expanded reception area UA.

Further, key image display for a multi-tap text entry system may be changed in a manner to facilitate a user's text entry, based on the number of touching operations, the timing at which the first letter of a key returns as the target letter to be input after repetitive touching operations, etc.

For example, when a predetermined number of continuous touching operations have been given and the first letter is the target letter to be input after going through a full round of the letters, these letters, which are assigned to one key image, may be rendered enterable from another key image.

Figure 10A:
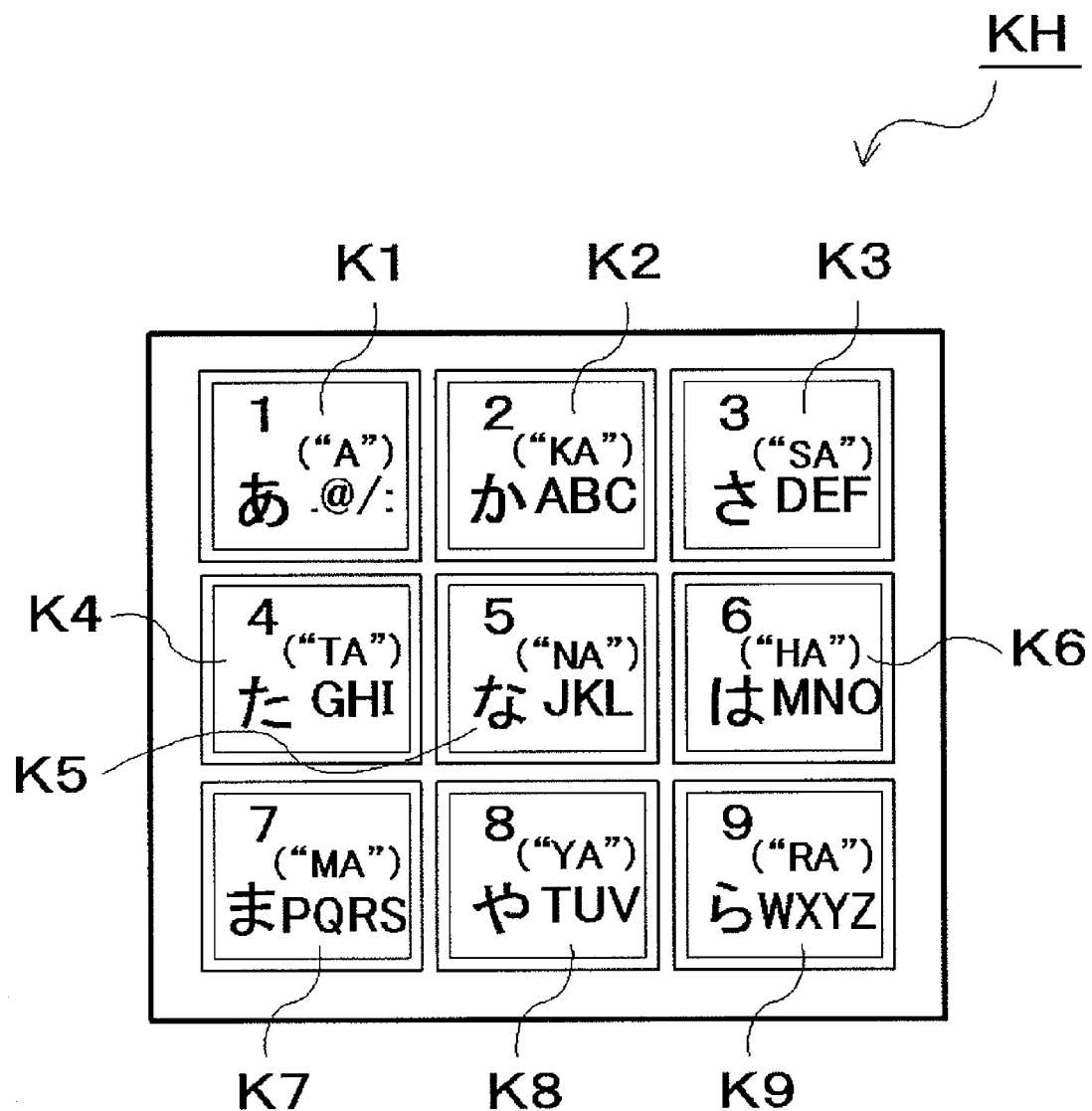
FIG. 10A is an exemplary diagram explaining how the display content of a key array image (or its respective key images) is changed.

Specifically, when a key array image KH shown in FIG. 10A is displayed on the second display unit 19, touching operations are continuously given to the key image K5 in this state. After one full round of the letters is completed as "NA"→"NI"→"NU"→"NE"→"NO"→"NA" (each representing a monosyllabic letter in Japanese), the display control unit 101 changes the content of the key array image KH.

Figure 10B:
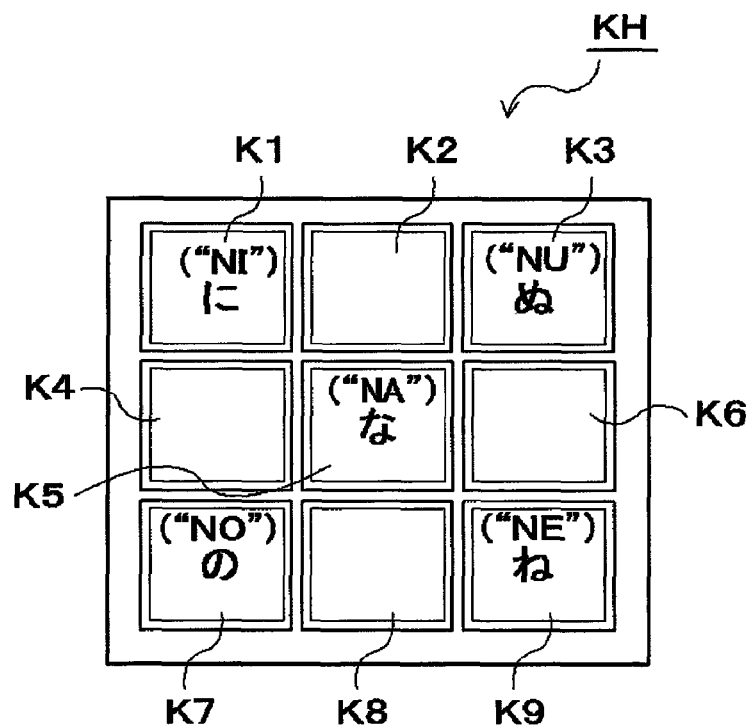
FIG. 10B is an exemplary diagram explaining how the display content of a key array image is changed.
Figure 10C:
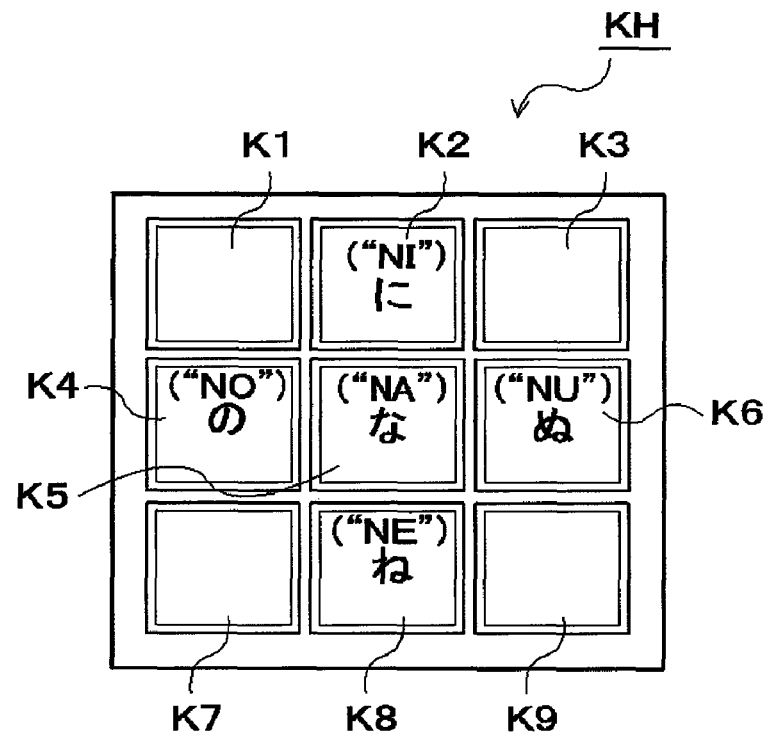
FIG. 10C is an exemplary diagram explaining how the display content of a key array image is changed.

For example, as shown in FIG. 10B and FIG. 10C, all the letters assigned to the key image K5 may be displayed at the same time to enable a user to enter a desired letter directly.

What is assumed here is that when a user tries to input one of the letters assigned to the key image K5, the user might overlook that very letter and have to wait one more round. Hence, displaying all the letters at one time to enable a direct input is more efficient and easier for the user. That is, when a predetermined touching operation is given to the key image K5, the key image display may be changed as shown in FIG. 10B and FIG. 10C immediately, to make letter input easier for the user. For example, when a long press (i.e., letting a predetermined time period elapse while keeping a key touched) is given to the key image K5, or when a predetermined number (e.g., two) of touching operations are given to the key image K5, the display control unit 101 may change the display contents of the plurality of key images K arrayed around the key image K5 as shown in FIG. 10B and FIG. 10C. Note that the process control unit 102 performs determination of a key image K that is given a touching operation by a long press, etc., based on a touch position, etc. supplied by the detecting unit 104, etc.

Then, the display control unit 101, having received a determination result from the process control unit 102, turns to function as the target image control unit, and displays the letters assigned to the key image that was given the long press, etc. by changing them to be the display contents of surrounding other key images.

When a touching operation is given in this state, in which the changed display content of each surrounding key image is displayed, the process control unit 102 determines the letter corresponding to the display content of the key image that has just been given the touching operation, as the letter having input by the user. For example, when a touching operation is given to the key image K2 in the state of FIG. 10C, the process control unit 102 determines the input as a letter "NI". Then, when a touching operation is given again to the key image K5, the process control unit 102 determines the input as a letter "NA".

It should be noted that not only a touching operation but any other may trigger determination of a letter that is input by a user. For example, the letter corresponding to a key image that is dragged (to be more specific, a key image that is released from a dragged touch having travelled thereto) may be determined as an input.

In this case, which includes only the case that the display content of surrounding key images has been changed by a long press, the process control unit 102 discriminates a key image from which a touch pen P (or a finger) is released after the display content is changed, and determines the letter corresponding to the display content of the discriminated key image as a letter that is input by the user. For example, when the touch pen P is dragged to the key image K4 and released therefrom in the state of FIG. 10C, which has appeared responsive to a long press, the process control unit 102 determines a letter "NO" as an input. When the touch pen P is released from the key image K5 without being moved, the process control unit 102 determines a letter "NA" as an input.

FIG. 10B and FIG. 10C presented above are example key array images, to which the display content is changed when the key image K5 in the center is given a long press, etc., so different key array images will be displayed in accordance with the position, etc. of a key image K that is given a long press, etc.

Figure 11A:
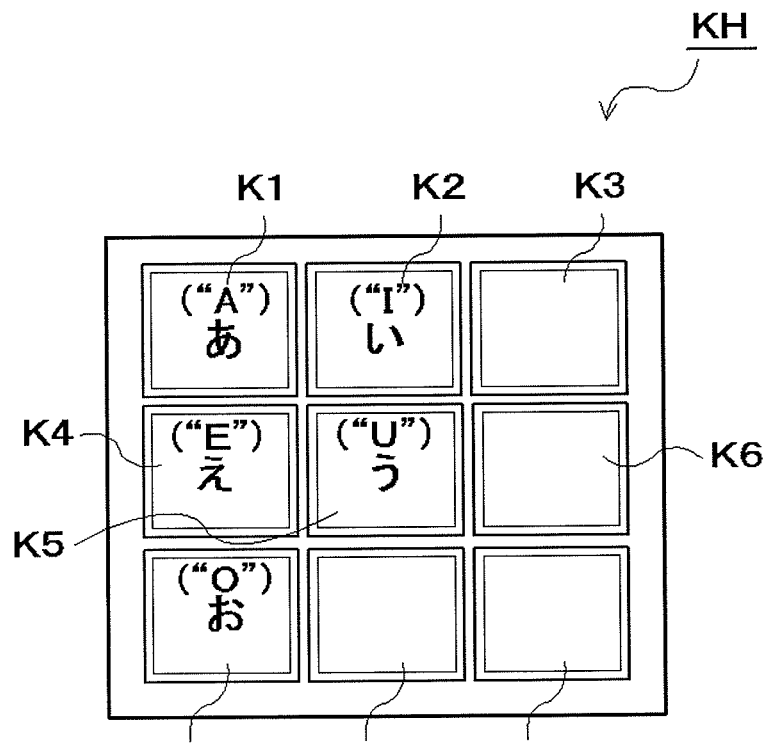
FIG. 11A is an exemplary diagram explaining how the display content of a key array image is changed in a different way.
Figure 11B:
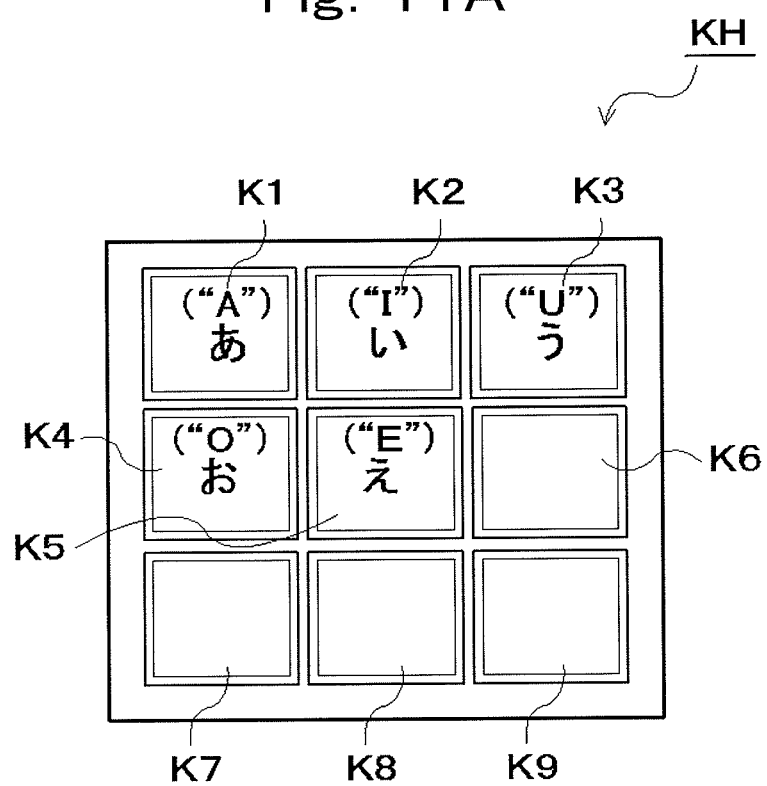
FIG. 11B is an exemplary diagram explaining how the display content of a key array image is changed in a different way.

For example, when a key image K on any of the four corners (e.g., the key image K1) is given a long press, etc., the display control unit 101 changes the display contents of a plurality of key images K that are arrayed in the vicinity of the key image K1 as shown in FIG. 11A and FIG. 11B.

Figure 12A:
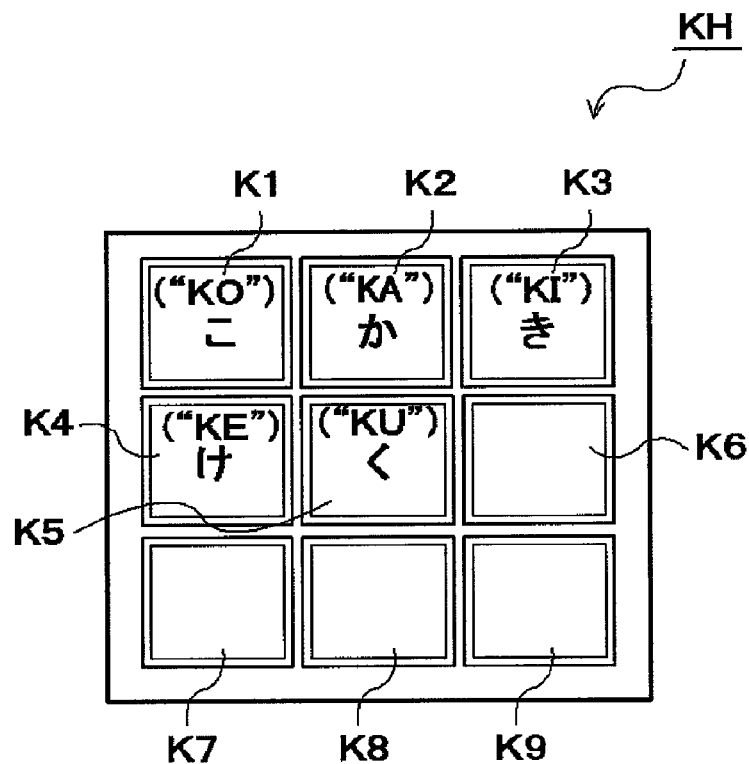
FIG. 12A is an exemplary diagram explaining how the display content of a key array image is changed in a different way.
Figure 12B:
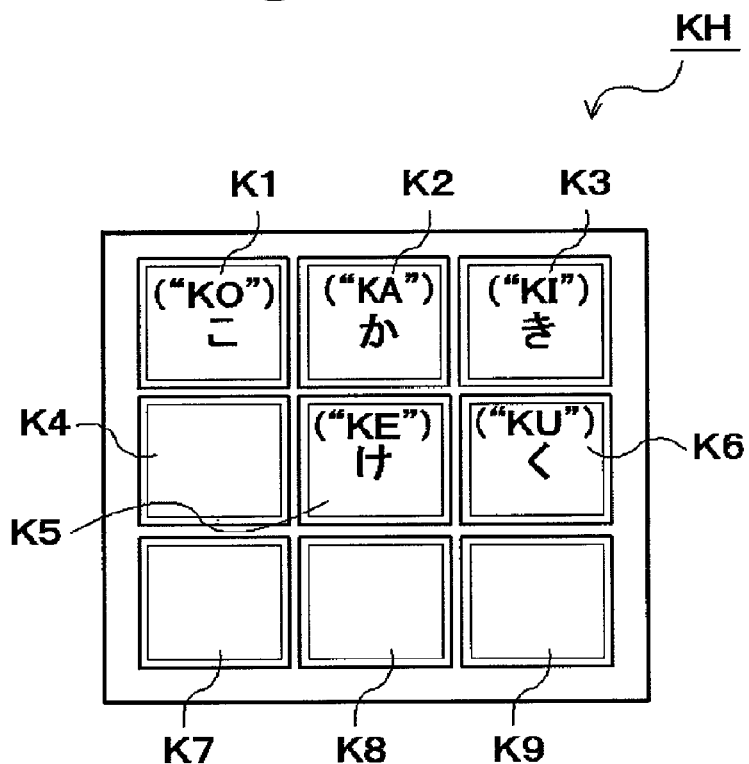
FIG. 12B is an exemplary diagram explaining how the display content of a key array image is changed in a different way.

Further, when any key image K that is on the edge except those on the four corners (e.g., the key image K2) is given a long press, etc., the display control unit 101 changes the display contents of a plurality of key images K that are arrayed in the vicinity of the key image K2 as shown in FIG. 12A and FIG. 12B.

Figure 13A:
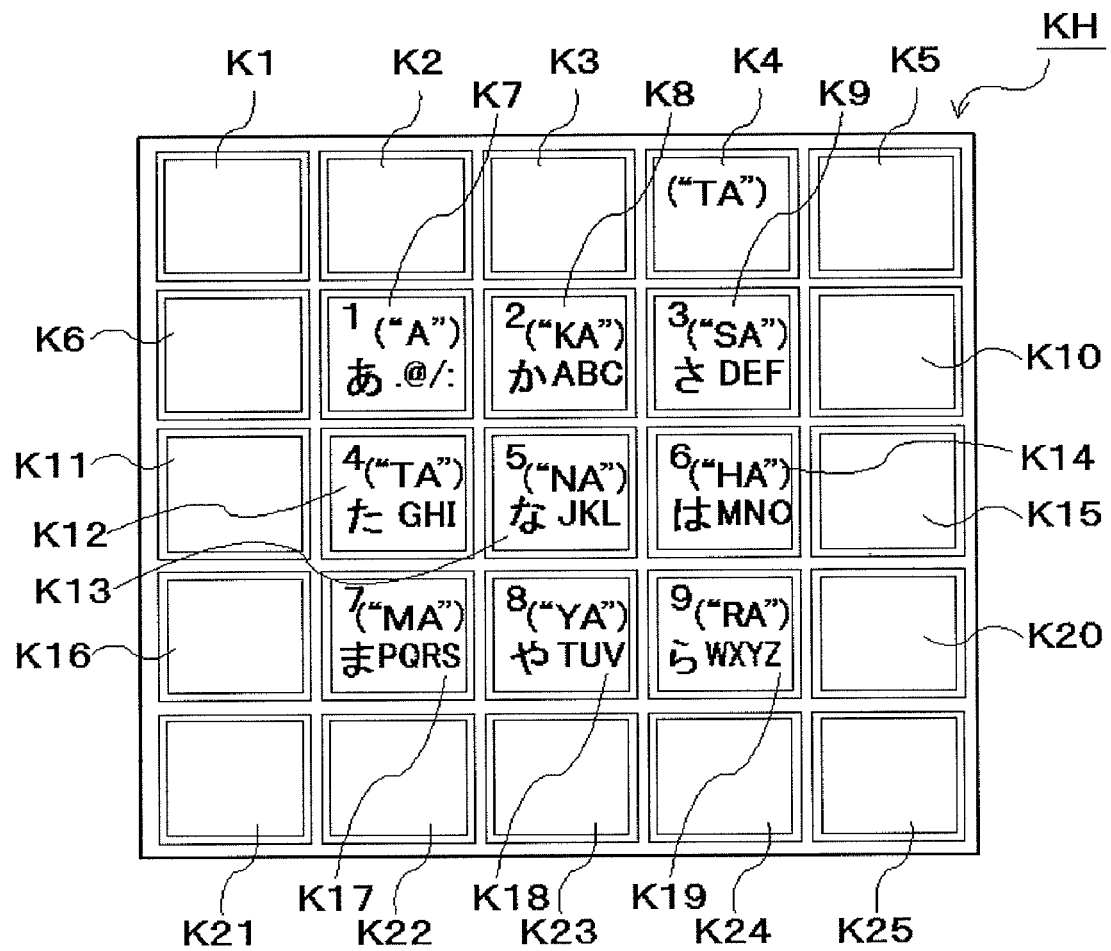
FIG. 13A is an exemplary diagram explaining how the display content of a different type of key array image (or its respective key images) is changed.

The key array image described above has been a case of nine key images K being arrayed, as an example. However, the number of key images K arrayed is not limited to nine, but may be arbitrarily changed. For example, as shown in FIG. 13A, a key array image KH, in which twenty-five key images K (K1 to K25) are arrayed, may be displayed.

In this case, assume that a plurality of different letters are assigned to each of the key images K7 to K9, K12 to K14, and K17 to K19, for example.

When a long press, etc. is given to any such key image that is assigned a plurality of different letters, the display control unit 101 displays the letters assigned to this key image by changing them to be the display contents of other key images that are arrayed in the vicinity, as well as the above.

Figure 13B:
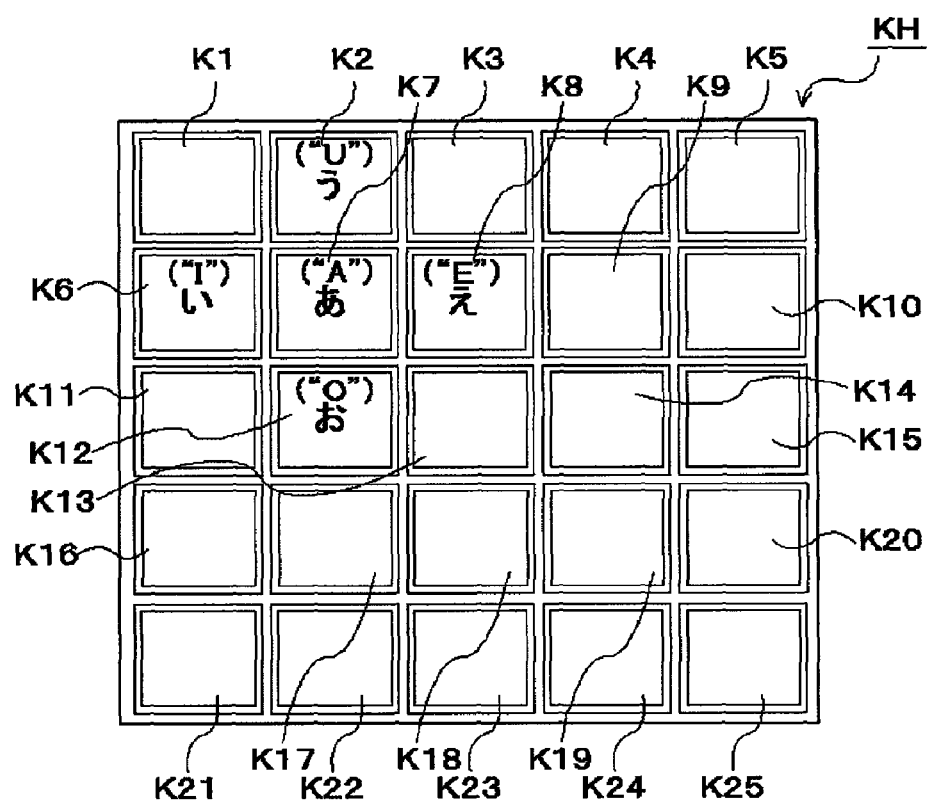
FIG. 13B is an exemplary diagram explaining how the display content of the different type of key array image is changed.
Figure 13C:
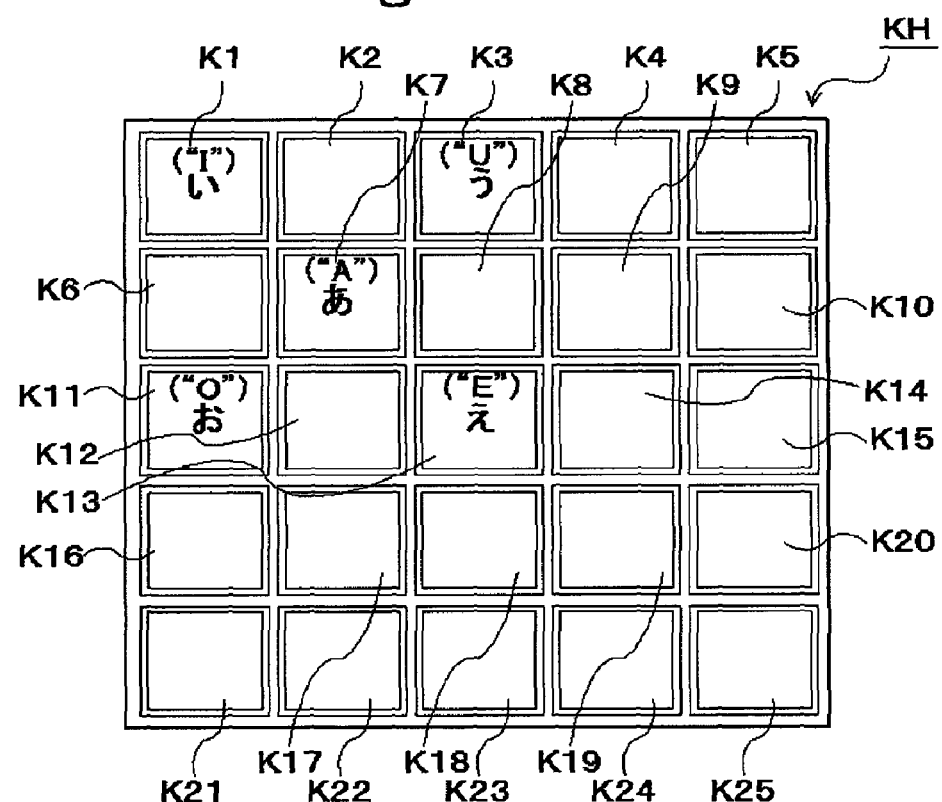
FIG. 13C is an exemplary diagram explaining how the display content of the different type of key array image is changed.

For example, when the key image K7 is given a long press, etc., the display control unit 101 changes the display contents of a plurality of key images K that area arrayed around the key image K7 as shown in FIG. 13B and FIG. 13C.

The embodiment described above has explained an example in which a touching operation is a contact to the touch panel 20. Otherwise, the embodiment can also appropriately be applied to a case in which a release from a contacted state is detected as a touching operation. That is, a position of release may be seen as a touch position, which may be then checked with the reception areas UA as well as the above, and any reception area UA may be subjected to expansion, etc.

In this case, an input reception device that processes a touch position at the time of release as an input can appropriately prevent an input failure in continuous touching operations.

The present application claims priority based on Japanese Patent Application No. 2007-211223, the content of which is incorporated herein in its entirety.

INDUSTRIAL APPLICABILITY

As explained above, the present invention can provide an input reception device, an area control method, an information recording medium, and a program that can appropriately prevent an input failure in continuous touching operations.

The invention claimed is:

1. An input reception device that receives an input via a touch panel that is disposed on a display unit, comprising:
    an area memory unit (103) that stores area information about an area on the touch panel, the area being a variable reception area corresponding to a predetermined target image displayed on the display unit;
    a detecting unit (104) that, in response to a touching operation to the touch panel, detects a touch position;
    a determining unit (105) that determines whether the detected touch position is within or outside a range of the stored reception area; and
    an area control unit (107) that sets, in the area memory unit (103), a reception area that matches an area on which the target image is displayed, and when a touch position is detected and determined to be within the range, expands the reception area to a predetermined range, and when a touching operation is not given to the expanded reception area within a predetermined time period, reduces the expanded reception area back to the reception area before being expanded.

2. An input reception device that receives an input via a touch panel that is disposed on a display unit, comprising:
    a display control unit (101) that displays a target image, which serves as an operation target, on the display unit;
    an area memory unit (103) that stores area information about an area on the touch panel, the area being a variable reception area corresponding to the displayed target image;
    a detecting unit (104) that, in response to a touching operation to the touch panel, detects a touch position, the touching operation including a contact to the touch panel;
    a determining unit (105) that determines whether the detected touch position is within or outside a range of the stored reception area;
    a time measuring unit (106) that measures a time period that has elapsed since the touching operation; and
    an area control unit (107) that sets, in the area memory unit (103), a first reception area that matches an area on which the target image is displayed; when a touch position is detected and determined to be within the range, expands the first reception area to a second reception area that covers a larger range than the first reception area; and when a touching operation is not given to the second reception area until the measured time period becomes equal to a predetermined time period, reduces the second reception area to the first reception area.

3. The input reception device according to claim 1
wherein the area control unit (107) expands the reception area by gradually changing at least one of its shape and its size based on a number of touching operations.

4. The input reception device according to claim 1
wherein the area control unit (107) expands the reception area toward a predetermined direction based on a change of touch positions.

5. The input reception device according to claim 1, further comprising a target image control unit (101) that expands or reduces the target image to a size of a corresponding reception area, which is expanded or reduced by the area control unit (107).

6. The input reception device according to claim 1
wherein the display unit displays thereon a predetermined number of the target image in an array, and
the input reception device further comprises a target image control unit (101) that, after a predetermined touching operation is given, changes display contents of a plurality of target images that are arrayed in vicinity of the target image that is given that touching operation.

7. The input reception device according to claim 6,
wherein each of the target images is in advance assigned a plurality of different letters, and
the target image control unit (101) changes the respective letters assigned to the target image that is given the touching operation, such that the letters become display contents of the target images arrayed in vicinity of the target image given the touching operation respectively.

8. An input reception device that receives an input via a touch panel that is disposed on a display unit, comprising:
a display control unit (101) that displays, in an array, a predetermined number of target images, each of which is in advance assigned a plurality of different letters, on the display unit;
a determining unit (102) that detects a touching operation that is given to the touch panel, including a contact thereto, and determines which one of the target images is given the touching operation; and
a target image control unit (101) that, after a predetermined touching operation is given, changes display contents of the target images that are arrayed in vicinity of the target image that is given that touching operation, to the letters assigned to the target image given the touching operation respectively.

9. An area control method of an input reception device that includes a memory unit (103) and receives an input via a touch panel disposed on a display unit,
the memory unit (103) storing area information about an area on the touch panel, the area being a variable reception area corresponding to a predetermined target image displayed on the display unit,
the method comprising:
a detecting step (S201, S202) of, in response to a touching operation to the touch panel, detecting a touch position;
a determining step (S203) of determining whether the detected touch position is within or outside a range of the reception area stored in the memory unit (103); and
an area controlling step (S205, S209) of setting, in the memory unit (103), a reception area that matches an area on which the target image is displayed; when a touch position is detected and determined to be within the range, expanding the reception area to a predetermined range; and when a touching operation is not given to the expanded reception area within a predetermined time period, reducing the expanded reception area back to the reception area before being expanded.

10. An information recording medium storing a program that controls a computer, which receives an input via a touch panel disposed on a display unit, to function as:
an area memory unit (103) that stores area information about an area on the touch panel, the area being a variable reception area corresponding to a predetermined target image displayed on the display unit;
a detecting unit (104) that, in response to a touching operation to the touch panel, detects a touch position;
a determining unit (105) that determines whether the detected touch position is within or outside a range of the stored reception area; and
an area control unit (107) that sets, in the area memory unit (103), a reception area that matches an area on which the target image is displayed; when a touch position is detected and determined to be within the range, expands the reception area to a predetermined range; and when a touching operation is not given to the expanded reception area within a predetermined time period, reduces the expanded reception area back to the reception area before being expanded.

11. A program that controls a computer, which receives an input via a touch panel disposed on a display unit, to function as:
an area memory unit (103) that stores area information about an area on the touch panel, the area being a variable reception area corresponding to a predetermined target image displayed on the display unit;
a detecting unit (104) that, in response to a touching operation to the touch panel, detects a touch position;
a determining unit (105) that determines whether the detected touch position is within or outside a range of the stored reception area; and
an area control unit (107) that sets, in the area memory unit (103), a reception area that matches an area on which the target image is displayed; when a touch position is detected and determined to be within the range, expands the reception area to a predetermined range; and when a touching operation is not given to the expanded reception area within a predetermined time period, reduces the expanded reception area back to the reception area before being expanded.

12. The input reception device according to claim 2,
wherein the area control unit (107) expands the reception area by gradually changing at least one of its shape and its size based on a number of touching operations.

13. The input reception device according to claim 2,
wherein the area control unit (107) expands the reception area toward a predetermined direction based on a change of touch positions.

14. The input reception device according to claim 2, further comprising a target image control unit (101) that expands or reduces the target image to a size of a corresponding reception area, which is expanded or reduced by the area control unit (107).

15. The input reception device according to claim 2,
wherein the display unit displays thereon a predetermined number of the target image in an array, and
the input reception device further comprises a target image control unit (101) that, after a predetermined touching operation is given, changes display contents of a plurality of target images that are arrayed in vicinity of the target image that is given that touching operation.

16. The input reception device according to claim 15,
wherein each of the target images is in advance assigned a plurality of different letters, and
the target image control unit (101) changes the respective letters assigned to the target image that is given the touching operation, such that the letters become display contents of the target images arrayed in vicinity of the target image given the touching operation respectively.

* * * * *